(12) United States Patent
Wakimoto et al.

(10) Patent No.: US 7,405,746 B2
(45) Date of Patent: Jul. 29, 2008

(54) IMAGE NAVIGATION DEVICE

(75) Inventors: Koji Wakimoto, Tokyo (JP); Shoji Tanaka, Tokyo (JP); Hiroaki Masuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/311,570

(22) PCT Filed: Apr. 24, 2002

(86) PCT No.: PCT/JP02/04079

§ 371 (c)(1),
(2), (4) Date: Dec. 24, 2002

(87) PCT Pub. No.: WO02/089091

PCT Pub. Date: Nov. 7, 2002

(65) Prior Publication Data

US 2003/0151664 A1   Aug. 14, 2003

(30) Foreign Application Priority Data

Apr. 26, 2001 (JP) .............................. 2001-130140
Jun. 14, 2001 (JP) .............................. 2001-180477

(51) Int. Cl.
*H04N 7/18* (2006.01)

(52) U.S. Cl. .................... 348/116; 348/113; 348/118; 348/119; 348/142; 348/148; 348/140; 701/213; 701/214; 701/201; 701/205; 701/207; 701/209; 701/210

(58) Field of Classification Search ................. 348/116, 348/113, 118, 135, 119, 129, 140, 142, 143, 348/148; 701/213, 214, 201, 205, 207, 209, 701/210

See application file for complete search history.

(56) References Cited

U.S. PATENT DOCUMENTS 5,862,511 A * 1/1999 Croyle et al. ................. 701/213

FOREIGN PATENT DOCUMENTS

| JP | 5-149756  | A |   | 6/1993 |
|----|-----------|---|---|--------|
| JP | 7-77431   |   | * | 3/1995 |
| JP | 7-77431   | A |   | 3/1995 |
| JP | 9-33271   |   | * | 2/1997 |
| JP | 9-33271   | A |   | 2/1997 |
| JP | 9-152348  |   | * | 6/1997 |
| JP | 9-152348  | A |   | 6/1997 |
| JP | 11-108684 |   | * | 4/1999 |
| JP | 11-108684 | A |   | 4/1999 |

* cited by examiner

*Primary Examiner*—Shawn An
(74) *Attorney, Agent, or Firm*—Birch, Stewart, Kolasch & Birch, LLP

(57) ABSTRACT

An estimate image is generated from a position and an angle of a camera and the estimate image is stored. A collating unit collates an estimate image with a scenery image, and corrects estimate values of a position and angles of the camera according to a result of the collation. An indication image generating unit generates an indication image by processing indication information stored in an indication information storing unit, based on position information that shows a position of the camera and angle information that shows angles of the camera after the correction processing stored in a position and angle information storing unit.

24 Claims, 23 Drawing Sheets

FIG.4
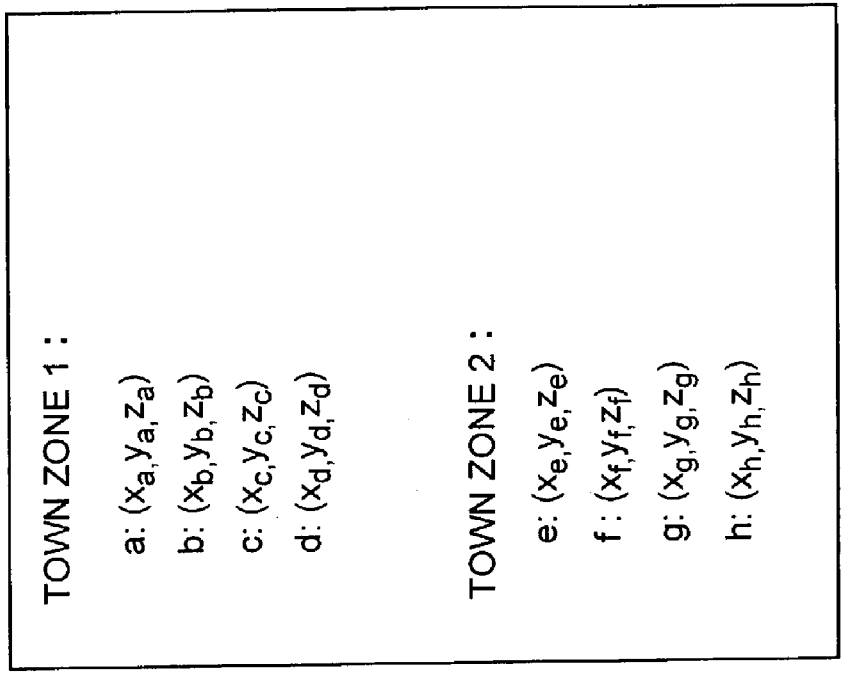
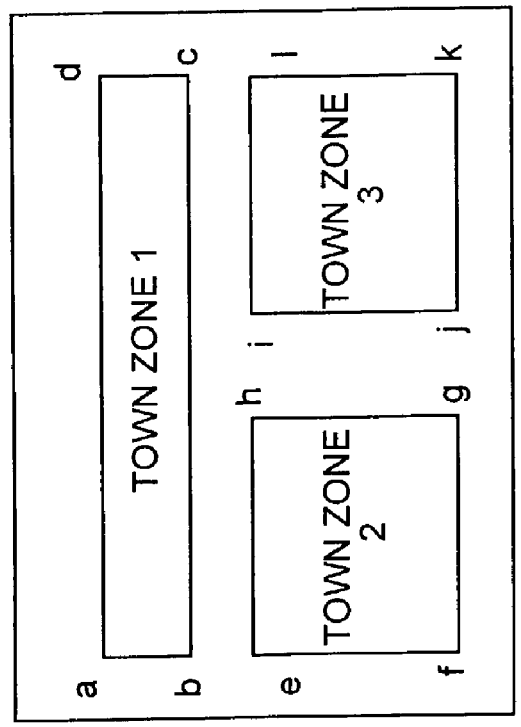

FIG.5
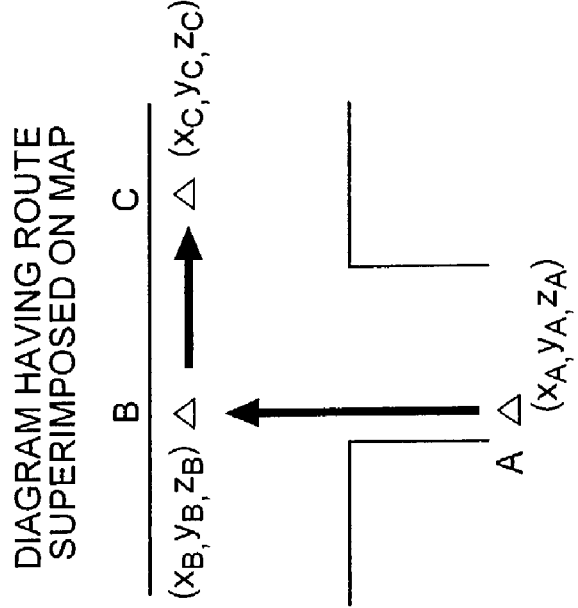
DIAGRAM HAVING ROUTE SUPERIMPOSED ON MAP
(b)
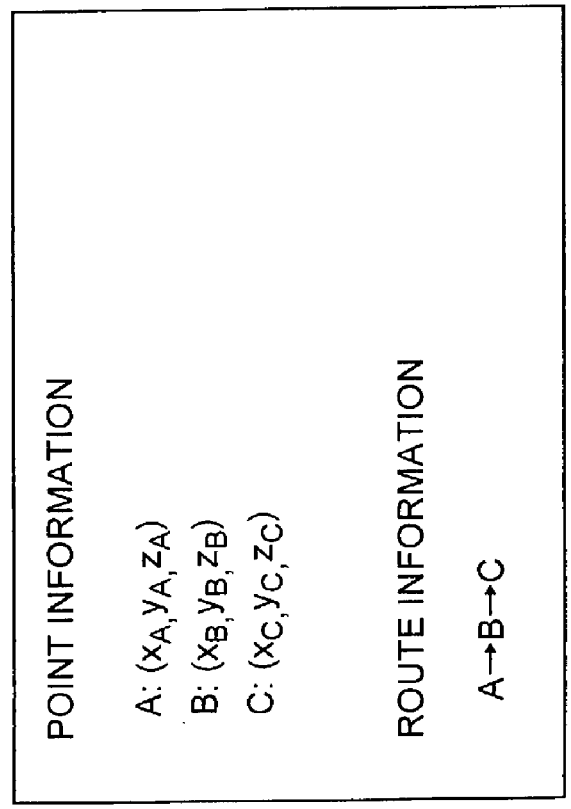
EXAMPLE OF INDICATION INFORMATION
POINT INFORMATION
A: $(x_A, y_A, z_A)$
B: $(x_B, y_B, z_B)$
C: $(x_C, y_C, z_C)$
ROUTE INFORMATION
A→B→C
(a)

FIG.6

EXAMPLE OF POSITION AND ANGLE INFORMATION

POSITION INFORMATION x,y,z

ANGLE INFORMATION $\alpha, \beta, \gamma$

FIG.11
CAMERA POSITION$(x_0, y_0, z_0)$
CAMERA ANGLE$(\alpha_0, \beta_0, \gamma_0)$
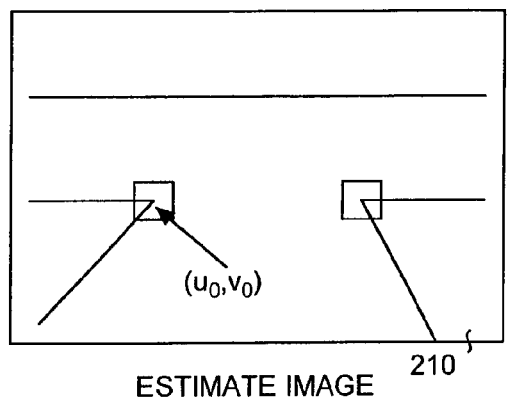
ESTIMATE IMAGE  210
(a)
CAMERA POSITION$(x_1, y_1, z_1)$
CAMERA ANGLE$(\alpha_1, \beta_1, \gamma_1)$
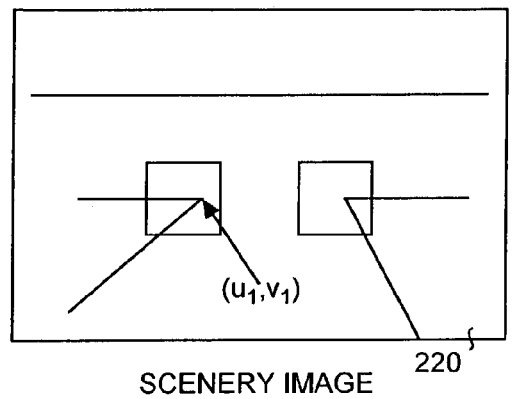
SCENERY IMAGE  220
(b)
WHEN $(\alpha_0, \beta_0, \gamma_0) = (\alpha_1, \beta_1, \gamma_1)$
$$\begin{pmatrix} u_1/f \\ v_1/f \\ 1 \end{pmatrix} = \begin{pmatrix} u_0/f \\ v_0/f \\ 1 \end{pmatrix} - R(\alpha_0, \beta_0, \gamma_0) \begin{pmatrix} x_1-x_0 \\ y_1-y_0 \\ z_1-z_0 \end{pmatrix}$$
(c)

WHEN PEDESTRIAN UTILIZES BY CARRYING

APPARATUS MAIN BODY
AND DISPLAY UNIT

FIG.22
INDICATION OF STEP 2 AT POINT A
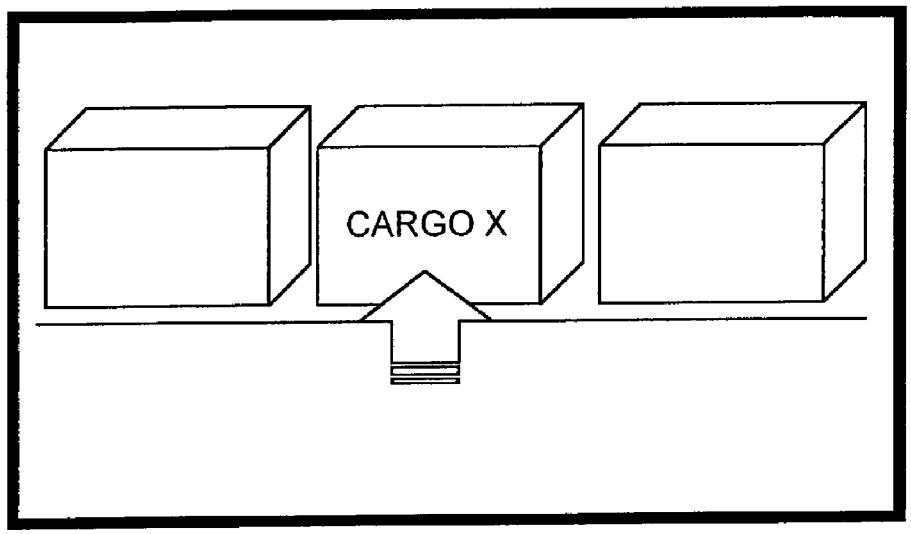
(a)
INDICATION OF STEP 4 AT POINT B
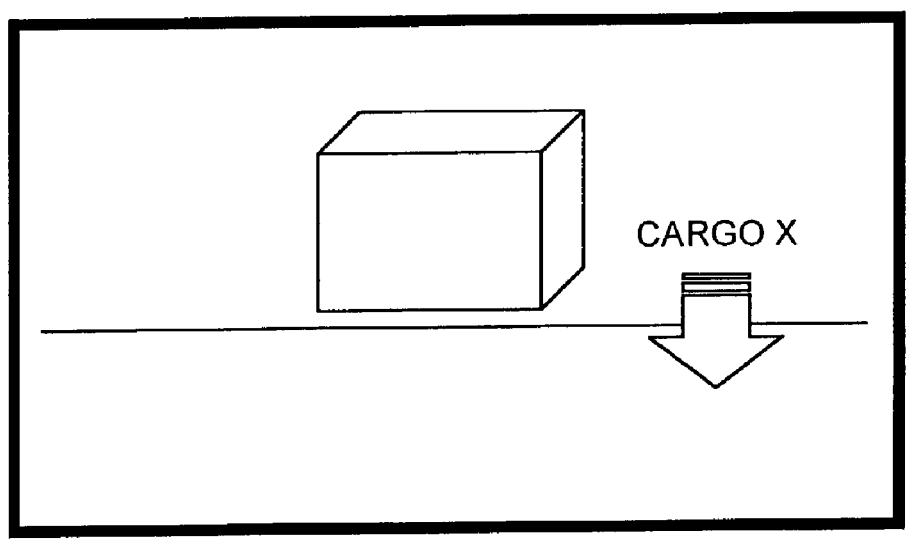
(b)

IMAGE NAVIGATION DEVICE

This application is the national phase under 35 U.S.C. § 371 of PCT International Application No. PCT/JP02/04079 which has an International filing date of Apr. 24, 2002, which designated the United States of America.

TECHNICAL FIELD

The present invention relates to a video navigation apparatus that provides a driver or a pedestrian with indication information such as a route guidance with an image using an information terminal mounted on a vehicle or a portable information terminal.

BACKGROUND ART

As examples of a conventional video navigation apparatus, there have been known a navigation apparatus disclosed in Japanese Patent Application Laid-open No. 9-33271 (publication 1), and a car navigation system disclosed in Japanese Patent Application Laid-open No. 11-108684 (publication 2). A principle that is common to the video navigation apparatuses in the publications 1 and 2 is shown in FIG. 23.

In FIG. 23, a position and angle sensor 1 detects a position and angles of a camera 2. As a position sensor, there is, for example, a sensor that knows a current position by using a GPS (Global Positioning System) satellite. Further, as an angle sensor, there are a one that utilizes magnetism, a one that utilizes the principle of gyro, and a one that combines these.

Position information that shows a position and angle information that shows angles of the camera 2 detected by the position and angle sensor 1 are stored in a position and angle information storing unit 3. The camera 2 is mounted on a vehicle, and takes a scene in front of the vehicle as image information, and stores this into a scenery image storing unit 4. Indication information (information such as an arrow mark, a symbol, and a character) of a proceeding direction to be provided to a user is generated mechanically or artificially, and is stored into an indication information storing unit 5. An indication image generating unit 6 processes position information and angle information stored in the position and angle information storing unit 3, based on the indication information stored in the indication information storing unit 5. At the same time, the indication image generating unit 6 combines a result of this processing and scenery image data stored in the scenery image storing unit 4 and stores it into a display unit 7.

Based on the principle, it is possible to guide a user to a target place by using an image that has an arrow mark, a symbol and characters embedded in an actual scene.

However, according to the conventional video navigation apparatus, it is necessary to install the position and angle sensor 1 that is an angle sensor in addition to a position sensor. Therefore, there has been a problem that the apparatus becomes large and heavy. Particularly, when a video navigation is carried out by using a portable telephone or a portable information terminal, it is necessary to make the apparatus small and light to enable the user to easily carry the apparatus. However, there has been a problem that it is difficult to install the position and angle sensor 1 and also obtain a compact and light apparatus suitable for carrying.

When a GPS is utilized as a position sensor, for example, there has been a problem that it is not possible to know a correct position at a position like in a tunnel or a shade of a building where a wave of a GPS satellite does not reach. Therefore, when such an error occurs in the position and angle sensor 1, there arises a deviation in the positions of an arrow mark, a symbol and characters that the estimate image generating unit 6 embeds into the actual scene, according to this error. Therefore, there has been a problem that the user is misled to a wrong direction.

For a subject that it is desired to accurately know a current position of the camera, a car navigation apparatus disclosed in Japanese Patent Application Laid-open No. 9-152348 (publication 3) has been known, for example. In this publication 3, there is disclosed a method of comparing an image prepared in advance with an image (a camera image) picked up with a camera, and correcting an error in a result of measurement using a GPS or the like based on a result of this comparison. This method is for estimating a camera position by collating a specific pattern (generally called a template) registered in advance such as a signal mechanism or a road sign with a camera image. In other words, based on a pattern matching, first a part image that coincides with the template is found from the camera image. Next, when a part that coincides with the template has been found, a distance from the camera to a signal mechanism or a road sign is estimated based on a size of the part image. In general, when the knowledge that a signal mechanism or a road sign is installed at the crossing is used, it is possible to estimate a position of the camera based on the information relating to a position of the crossing.

However, according to the method of correcting a measured result disclosed in the publication 3, the following problems occur. At a position where an object that becomes a mark having substantially a fixed shape like a signal mechanism or a road sign exists, it is possible to estimate a camera position based on this object. However, at a position where it is not possible to set an object having substantially a fixed shape like a signal mechanism or a road sign as a mark, it is not possible to estimate a camera position.

According to the method of correcting an error of a measured result, it is necessary to search for a part image that coincides with a plurality of templates set in advance from the camera image that changes each moment. However, when a search range becomes large, the processing quantity of pattern matching processing increases, and precision tends to become lower. Consequently, according to the method of correcting an error of a measured result, there has been a problem that it is hard to process the pattern matching in a short time and in high precision.

Therefore, it is a first object of this invention to provide a video navigation apparatus that can guide a user by properly embedding indication information such as an arrow mark, a symbol and characters into an actual scene, by estimating position information and angle information of a camera in a short time and in high precision, using information of only one sensor out of an angle sensor and a position sensor, or using information including errors from the position and position sensors.

It will be considered that a conventional video navigation apparatus including the video navigation apparatuses described in the publications 1 and 2 is mounted on a work vehicle such as a forklift, a crane truck, and a bulldozer, and that a work procedure is indicated to a driver. It is usual that these work vehicles work within a predetermined area, and therefore, these vehicles repeatedly pass the same point frequently. However, according to the conventional video navigation apparatus, indication information such as an arrow mark is corresponded to a specific point in advance. Therefore, when a procedure is to make a left turn at the first time and make a right turn at the second time at the same point A, for example, both an arrow mark of the left turn and an arrow mark of the right turn are displayed at the point A. Consequently, there is a problem that it is not possible to give proper guidance.

Therefore, it is a second object of this invention to provide a video navigation apparatus that can indicate a series of work procedure following this order.

DISCLOSURE OF THE INVENTION

A video navigation apparatus relating to this invention includes an image photographing unit that photographs a scene, an estimating unit that estimates a position and angles of the photographing unit, an estimate image generating unit that generates an estimate image corresponding to estimate values of a position and angles of the photographing unit estimated by the estimating unit, a collating unit that collates an estimate image generated by the estimate image generating unit with a scenery image photographed by the photographing unit, and corrects an estimate value estimated by the estimating unit according to a result of the collation, an indication image generating unit that generates an indication image by processing indication information indicated in advance based on position information that shows a position of the photographing unit and angle information that shows angles of the photographing unit after correction processing by the collating unit, and a display unit that displays an indication image generated by the indication image generating unit.

According to the above mentioned video navigation apparatus, the estimate image generating unit generates an estimate image corresponding to estimate values of a position and angles of the photographing unit estimated by the estimating unit. The collating unit collates this estimate image with a scenery image photographed by the photographing unit, and corrects an estimate value estimated by the estimating unit according to a result of the collation. Further, the indication image generating unit generates an indication image by processing indication information indicated in advance based on position information that shows a position and angle information that shows angles of the photographing unit after the correction processing.

According to a video navigation apparatus relating to the next invention, the indication image generating unit processes the indication information based on the position information and the angle information, and generates an indication image by combining a result of the processing with any one of a scenery image photographed by the photographing unit and an estimate image generated by the estimate image generating unit.

According to the above mentioned video navigation apparatus, the indication image generating unit processes the indication information based on the position information and the angle information, and generates an indication image by combining a result of the processing with any one of a scenery image and an estimate image.

According to a video navigation apparatus relating to the next invention, the estimating unit estimates a current position and angles of the photographing unit based on the record of information on positions and angles of the photographing unit up to the present.

According to the above mentioned video navigation apparatus, the estimating unit estimates a current position and angles of the photographing unit based on the record of information on positions and angles of the photographing unit up to the present.

According to a video navigation apparatus relating to the next invention, the estimate image generating unit generates an estimate image corresponding to estimate values of a position and angles of the photographing unit based on space information set in advance.

According to the above mentioned video navigation apparatus, the estimate image generating unit generates an estimate image corresponding to estimate values of a position and angles of the photographing unit based on space information.

According to a video navigation apparatus relating to the next invention, the estimate image generating unit generates an actual photograph image corresponding to estimate values of a position and angles of the photographing unit as an estimate image.

According to the above mentioned video navigation apparatus, the estimate image generating unit generates an actual photograph image corresponding to estimate values of a position and angles of the photographing unit as an estimate image.

According to a video navigation apparatus relating to the next invention, the estimating unit sets the next target position of a user as estimate values based on the indication information.

According to the above mentioned video navigation apparatus, the estimating unit estimates the next target position of a user as estimate values based on the indication information.

According to a video navigation apparatus relating to the next invention, the video navigation apparatus further comprises a control unit that controls the photographing unit to maintain a predetermined angle that is determined based on the indication information.

According to the above mentioned video navigation apparatus, the control unit controls the photographing unit to maintain a predetermined angle that is determined based on the indication information.

According to a video navigation apparatus relating to the next invention, the collating unit notifies a user of information that shows a level of coincidence between the scenery image and the estimate image or a change in the coincidence level.

According to the above mentioned video navigation apparatus, the collating unit notifies a user of information that shows a level of coincidence between the scenery image and the estimate image or a change in the coincidence level.

According to a video navigation apparatus relating to the next invention, the video navigation apparatus further comprises, a first storing unit that stores a series of information that show positions and angles of the photographing unit, and a second storing unit that stores a series of the scenery images, wherein when the series of information that show positions and angles of the photographing unit stored in the first storing unit do not satisfy a predetermined condition, the collating unit collates an estimate image with a scenery image again by tracing back the series based on the contents stored in the first and second storing units.

According to the above mentioned video navigation apparatus, when the series of information that show positions and angles of the photographing unit stored in the first storing unit do not satisfy a predetermined condition, the collating unit collates an estimate image with a scenery image again by tracing back the series based on the contents stored in the first and second storing units.

According to a video navigation apparatus relating to the next invention, the indication image generating unit selects indication information based on a distance between the photographing unit and a position corresponding to the indication information and angles of a corner formed by a direction of a straight line that connects between the photographing unit and a position corresponding to the indication information and a view direction of the photographing unit, or a positional relationship between the photographing unit and a position corresponding to the indication information and a structure on the space, and processes an indication image by processing the selected indication information.

According to the above mentioned video navigation apparatus, the indication image generating unit selects indication information based on a distance between the photographing unit and a position corresponding to the indication information and angles of a corner formed by a direction of a straight line that connects between the photographing unit and a position corresponding to the indication information and a view direction of the photographing unit, or a positional relationship between the photographing unit and a position corresponding to the indication information and a structure on the space, and processes an indication image by processing the selected indication information.

In order to achieve the second object, a video navigation apparatus relating to this invention includes an image photographing unit that photographs a scene, an estimating unit that estimates a position and angles of the photographing unit, an indication information generating unit that generates indication information based on work procedure information that shows a work procedure set in advance and progress state information that shows a progress state of a work implemented based on the work procedure, an indication image generating unit that generates an indication image by processing indication information generated by the indication information generating unit based on position information that shows a position of the photographing unit and angle information that shows angles of the photographing unit estimated by the estimating unit, and a display unit that displays an indication image generated by the indication image generating unit.

According to the above mentioned video navigation apparatus, when the indication information generating unit has generated indication information based on work procedure information and progress state information, the indication image generating unit generates an indication image by processing indication information generated by the indication information generating unit based on position information that shows a position of the photographing unit and angle information that shows angles of the photographing unit estimated by the estimating unit.

According to a video navigation apparatus relating to the next invention, the video navigation apparatus further comprises a progress state storing unit that decides a progress state of the work based on the work procedure information and estimate values of the position information or the angle information estimated by the estimating unit, and stores a result of the decision.

According to the above mentioned video navigation apparatus, the progress state storing unit decides a progress state of the work based on the work procedure information and estimate values of a position or angles, and stores a result of the decision.

According to a video navigation apparatus relating to the next invention, the video navigation apparatus further comprises, a progress state storing unit that is mounted on a working vehicle, and that decides a progress state of the work based on the work procedure information and a current state of the vehicle, and stores a result of the decision.

According to the above mentioned video navigation apparatus, the progress state storing unit decides a progress state of the work based on the work procedure information and a current state of the vehicle, and stores a result of the decision.

BRIEF DESCRIPTION OF THE DRAWINGS

FIG. 4 is a diagram that explains one example of space information stored in a space information storing unit of the video navigation apparatus shown in FIG. 1;

FIG. 5 is a diagram that explains one example of indication information stored in an indication information storing unit of the video navigation apparatus shown in FIG. 1;

FIG. 6 is a diagram that explains one example of position information and angle information stored in a position and angle information storing unit of the video navigation apparatus shown in FIG. 1;

FIG. 11 is a diagram that explains a collation processing process of a collating unit of a video navigation apparatus as a second embodiment of the present invention;

FIG. 22 is a diagram that explains one example of an indication image generated by an indication image generating unit of the video navigation apparatus shown in FIG. 18.

BEST MODE FOR CARRYING OUT THE INVENTION

Preferred embodiments of the video navigation apparatus relating to this invention will be explained below with reference to the accompanying drawings.

FIRST EMBODIMENT

Figure 1:
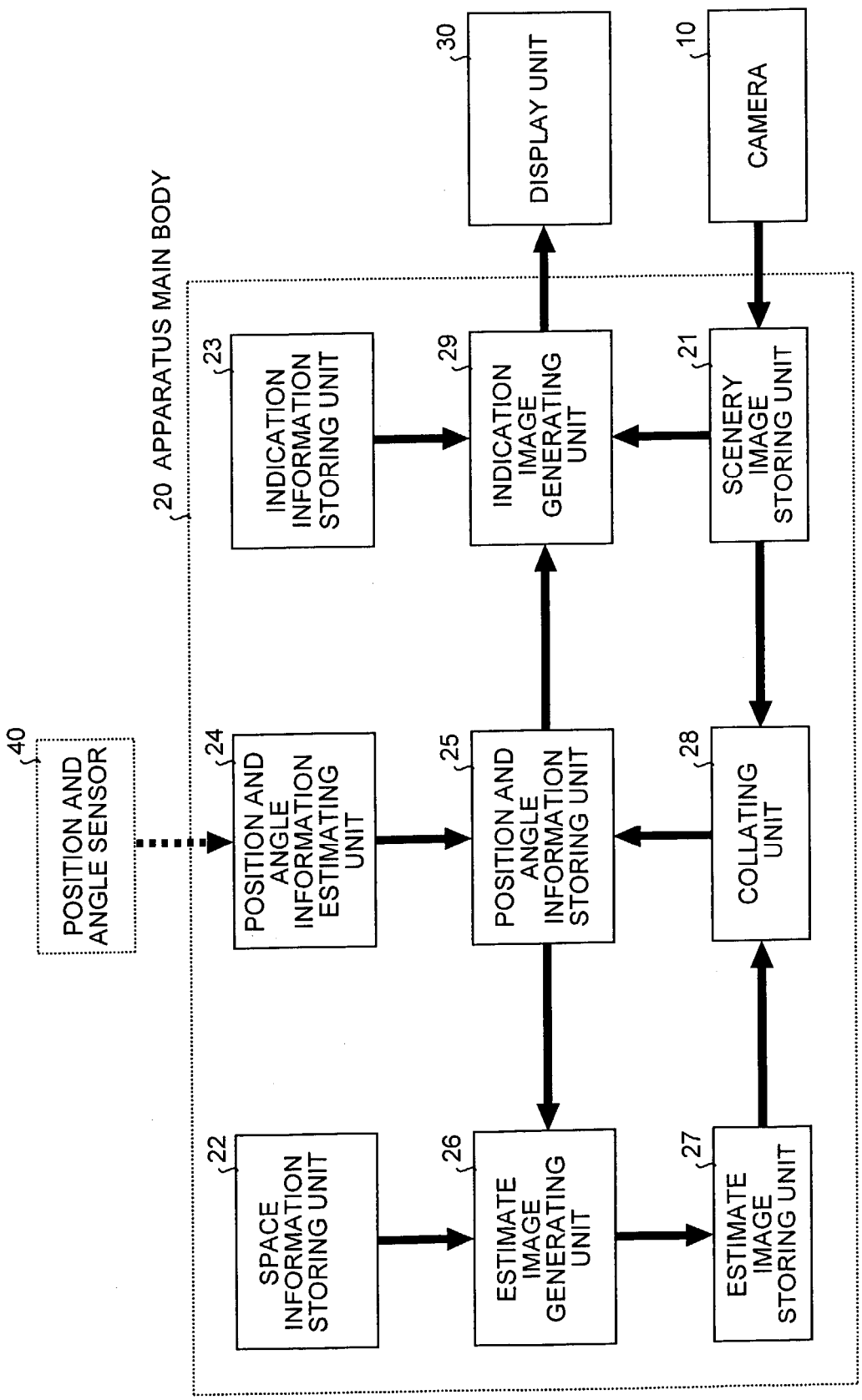
FIG. 1 is a block diagram that shows a structure of a video navigation apparatus as a first embodiment of this invention.
Figure 2:
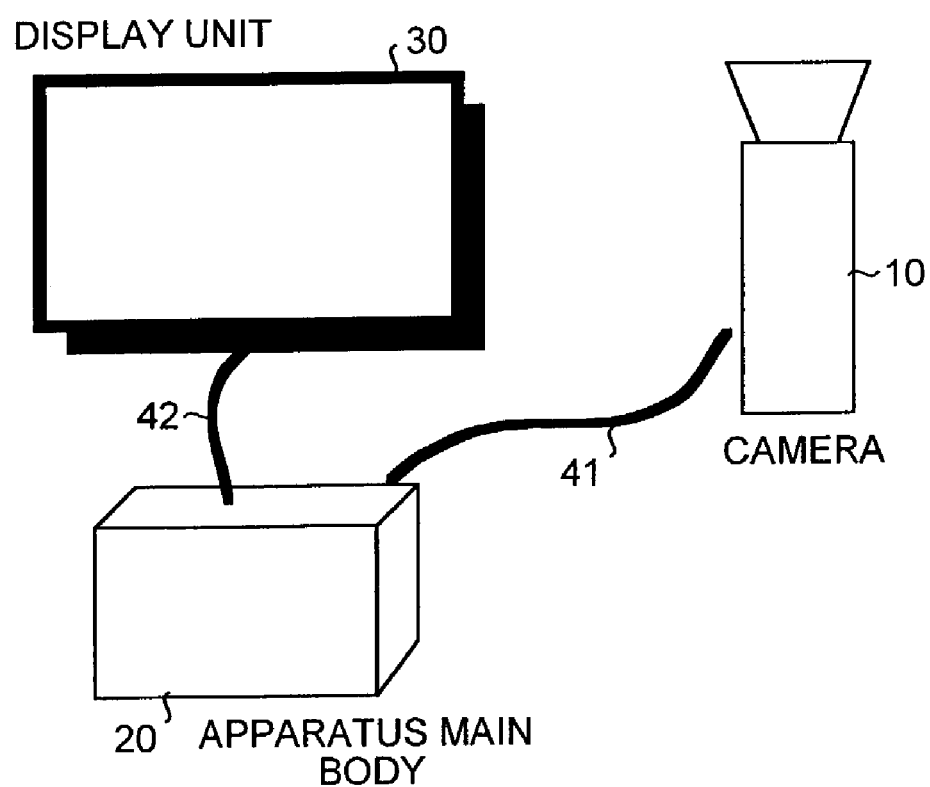
FIG. 2 is an appearance view that shows a schematic appearance of the video navigation apparatus as the first embodiment of this invention.

FIG. 1 shows a structure diagram of a video navigation apparatus according to the present invention, and FIG. 2 shows an appearance view of the video navigation apparatus in a mode that the video navigation apparatus of the present invention is built into a vehicle.

As shown in FIG. 2, the video navigation apparatus is constructed of a camera 10, which is a visible camera, an apparatus main body 20, and a display unit 30, for example.

The camera 10 is installed at a position where it is possible to obtain a scene close to a field of vision of a driver, such as on the roof of the vehicle or near the windshield within the vehicle, and is connected to the apparatus main body 20 with a cable 41. A video signal output by the camera 10 is transmitted to the apparatus main body 20 via the cable 41 according to a format called the NTSC, for example.

The apparatus main body 20 is a computer that includes a CPU (central processing unit) and a storing unit, and executes a processing of generating an indication image that has indication information properly embedded into a scenery image, of which details will be explained later. The apparatus main body 20 is provided with data input and output interfaces that have not been shown in the diagram.

The display unit 30 is realized using a liquid crystal display, and is installed at a position where the driver inside the vehicle can have a good command of view. The display unit 30 is connected to the apparatus main body 20 with a cable 42.

As shown in FIG. 1, it is possible to connect any one of a position sensor and an angle sensor or both (hereinafter to be referred to as a position and angle sensor) 40 to a data input and output interface not shown of the apparatus main body 20 via a cable not shown. As the position and angle sensor 40, both a position sensor and an angle sensor or any one of the position sensor and the angle sensor may be connected to the data input and output interface not shown. In this embodiment, it is assumed that only a position sensor using the GPS is connected as the position and angle sensor 40, and an angle sensor is not connected.

As shown in FIG. 1, the apparatus main body 20 is constructed of a scenery image storing unit 21 that stores a scenery image photographed by the camera 10, a space information storing unit 22 that stores space information, an indication information storing unit 23 that stores indication information, a position and angle information estimating unit (corresponding to an estimating unit in the claim) 24 that estimates a position and angles of the camera 10, a position and angle information storing unit (corresponding to an estimate value storing unit in the claim) 25 that stores estimate values of a position and angles of the camera 10, an estimate image generating unit 26 that generates an estimate image corresponding to estimate values of a position and angles of the camera 10, an estimate image storing unit 27 that stores an estimate image generated by the estimate image generating unit 26, a collating unit 28 that collates an estimate image stored in the estimate image storing unit 27 with a scenery image stored in the scenery image storing unit 21, and corrects indication information and angle information stored in the position and angle information storing unit 25 according to a result of the collation, and an indication image generating unit 29 that generates an indication image by processing indication information stored in the indication information storing unit 23 based on indication information and angle information after the correction stored in the position and angle information storing unit 25.

The scenery image storing unit 21 is realized using a frame glover (not shown) inserted in the apparatus main body 20 as an expansion board. This frame glover has a function of converting a video signal from the camera 10 into image data of a digital format and storing this data.

Each of the space information storing unit 22, the indication information storing unit 23, the position and angle information estimating unit 24, the position and angle information storing unit 25, the estimate image generating unit 26, the estimate image storing unit 27, the collating unit 28, and the indication image generating unit 29 is realized by the CPU that reads from the storing unit, software (a program) to achieve each processing or function that operates on the computer and executes this software.

The operation of the video navigation apparatus will be explained with reference to FIG. 3.

In the video navigation apparatus, when space information has been set to the space information storing unit 22 (step S110) and indication information has been set to the indication information storing unit 23 (step S120), the position and angle information estimating unit 24 determines estimate values of a position and angles of the camera 10 based on sensor information from the position and angle sensor 40, and stores these pieces of information into the position and angle information storing unit 25 (step S130).

The estimate image generating unit 26 generates an estimate image based on the space information stored in the space information storing unit 22 and the estimate values of a position and angles of the camera 10 stored in the position and angle information storing unit 25, and stores the estimate image into the estimate image storing unit 27 (step S140).

When the scenery image storing unit 21, that is, the frame glover, has fetched and stored the video signal input from the camera 10 (step S150), the collating unit 28 collates the estimate image stored in the estimate image storing unit 27 with the scenery image stored in the scenery image storing unit 21, and verifies whether the estimate values of position and angle information are correct or not (step S160). When a decision has been made that there is an error in the estimate values of the position information and the angle information as a result of the verification, the scenery image storing unit 21 corrects the position and angle information stored in the position and angle information storing unit 25 (step S170).

The indication image generating unit 29 processes the indication information stored in the indication information storing unit 23 based on the corrected position information and angle information stored in the position and angle information storing unit 25, and embeds this processed indication image into the scenery image stored in the scenery image storing unit 21, thereby to generate an indication image. Thereafter, the indication image generating unit 29 displays this indication image on the display unit 30 (step S180).

Processing contents of the processing procedure that shows the processing operation of the video navigation apparatus will be explained in detail.

(1) Setting Space Information (The Processing at Step S110)

A space in which the vehicle runs is modeled and stored in advance in the space information storing unit 22. A method known in the field of three-dimensional computer graphics is used for this. In other words, each structure like a building on the space is approximated by a polyhedron, and each polygon that constitutes the polyhedron is described in coordinates of each vertex.

FIG. 4 shows an example that information of town zones are described as space information. In this example, the surrounding of each town zone is described in a polygon as shown in FIG. 4(a), and coordinates of each vertex of the polygon shown in FIG. 4(a) are arranged in the order along the sides of the polygon as shown in FIG. 4(b), thereby to show the position of this town zone. It is also possible to describe wall surfaces of a building using coordinates of each vertex in the same method.

(2) Setting Indication Information (The Processing at Step S120)

Indication information is route information to be transmitted to a user, and an arrow mark that indicates a proceeding direction and guide information of a building that becomes a mark are examples of the indication information. These pieces of indication information are stored in advance in the indication information storing unit 23.

FIG. 5(a) shows one example of indication information. In this example, a proceeding route at a crossing is set in the order of A to B to C. As information to indicate this proceeding route, information consisting of point information at point A, point B and point C and route information is set, as shown in FIG. 5(a). The point information includes position information (coordinate information) of each point, and the route information is expressed by a list that connects each point in the order (in the order of A, B, and C, in this example).

It is possible to mechanically generate this kind of indication information based on the information of a target place for the user, for example, by utilizing map information.

FIG. 5(b) shows a state that the indication information shown in FIG. 5(a) is superimposed on a map. In FIG. 5(b), three symbols Δ show positions of points A, B, and C respectively.

(3) Estimating Position and Angle Information (The Processing at Step S130)

The position and angle information estimating unit 24 periodically estimates coordinates (x, y, z) that show a current position of the camera 10 and three angles α, β and γ that show current angles of the camera 10, and stores these pieces of information into the position and angle information storing unit 25, as shown in FIG. 6.

Figure 7:
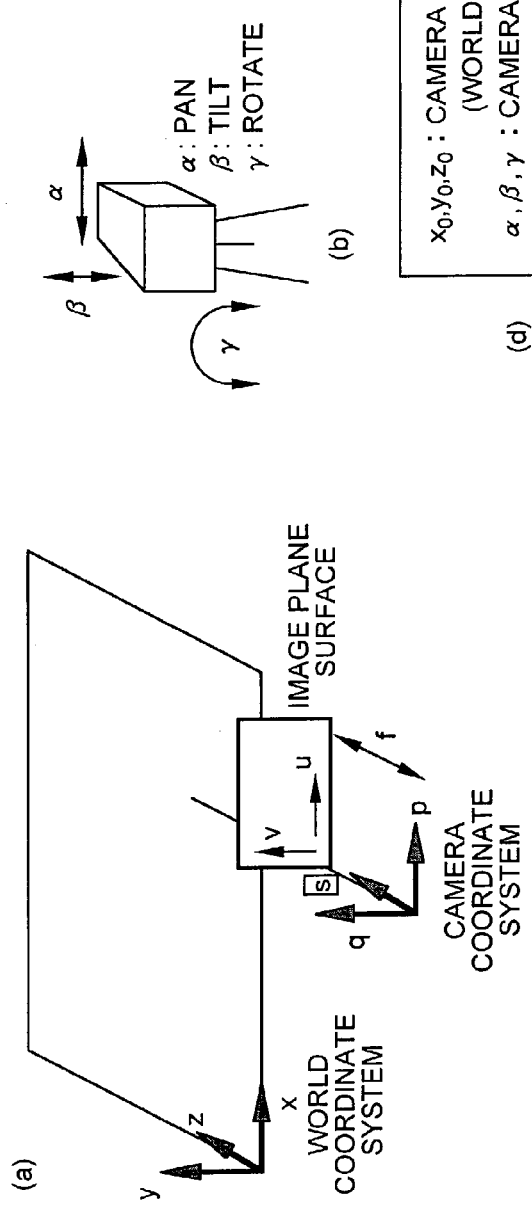
FIG. 7 is a diagram that explains a relationship of each coordinate system.

In the above, (x, y, z) shows coordinates of a three-dimensional coordinate system (called a world coordinate system) using a predetermined reference point as an origin as shown in FIG. 7(a), and α, β, and γ show angles corresponding to pan, tilt, and rotate of the camera 10 respectively as shown in FIG. 7(b).

A current position of the camera 10 is estimated by periodically fetching and detecting outputs of a GPS position sensor as the position and angle sensor 40 that is connected to the outside. However, as the value of the height y of the camera 10 is substantially fixed when the camera is fixed to a vehicle, a fixed value may be set in advance. When latest data of the position sensor cannot be obtained, a current position is estimated based on several nearest data.

For the angles of the camera 10, current angles are estimated based on several nearest data. It is assumed here that the processing is repeated in one second period, and angle information one second before is utilized straight as estimate values. In this instance, it is necessary to se the first angle information in a certain method. For example, there is a method of estimating a proceeding direction of a vehicle based on a change in the position information, and determining estimate values of the angles of the camera based on this. In other words, when a position is Xt at a time t and a position is Xt' at a time t', (Xt'−Xt) may be set as estimate values of the angles of the camera 10.

The position and angle information estimating unit 24 determines estimate values of the position and angle information of the camera in the manner.

(4) Generating an Estimate Image (The Processing at Step S140)

It has been known that a relational equation shown in FIG. 7(c) is established between the point (x, y, z) in the world coordinate system and the point (u, v) in the scenery image corresponding to this shown in FIG. 7(a).

A matrix R is a 3×3 matrix that is determined by the angles α, β, and γ of the camera called a rotation matrix. A camera constant f is a value own to the camera, and this can be set in advance by measuring.

Therefore, when the obtained estimate values of a position and angles of the camera 10 are utilized, it is possible to determine the coordinates (u, v) in the scenery image corresponding to the given coordinates (x, y, z) in the three-dimensional space.

The estimate image generating unit 26 can generate an estimate image by applying the principle to each constituent element of the space information set in advance. Therefore, the estimate image generating unit 26 stores the estimate image generated in this way into the estimate image storing unit 27.

(5) Fetching a Scenery Image (The Processing at Step S150)

The frame glover (the scenery image storing unit 21) inserted in the apparatus main body 20 as an expansion board fetches and stores a video signal input from the camera 10 at a predetermined period such as once per one second.

(6) Collating a Scenery Image with an Estimate Image (The Processing at Step S160)

Figure 8:
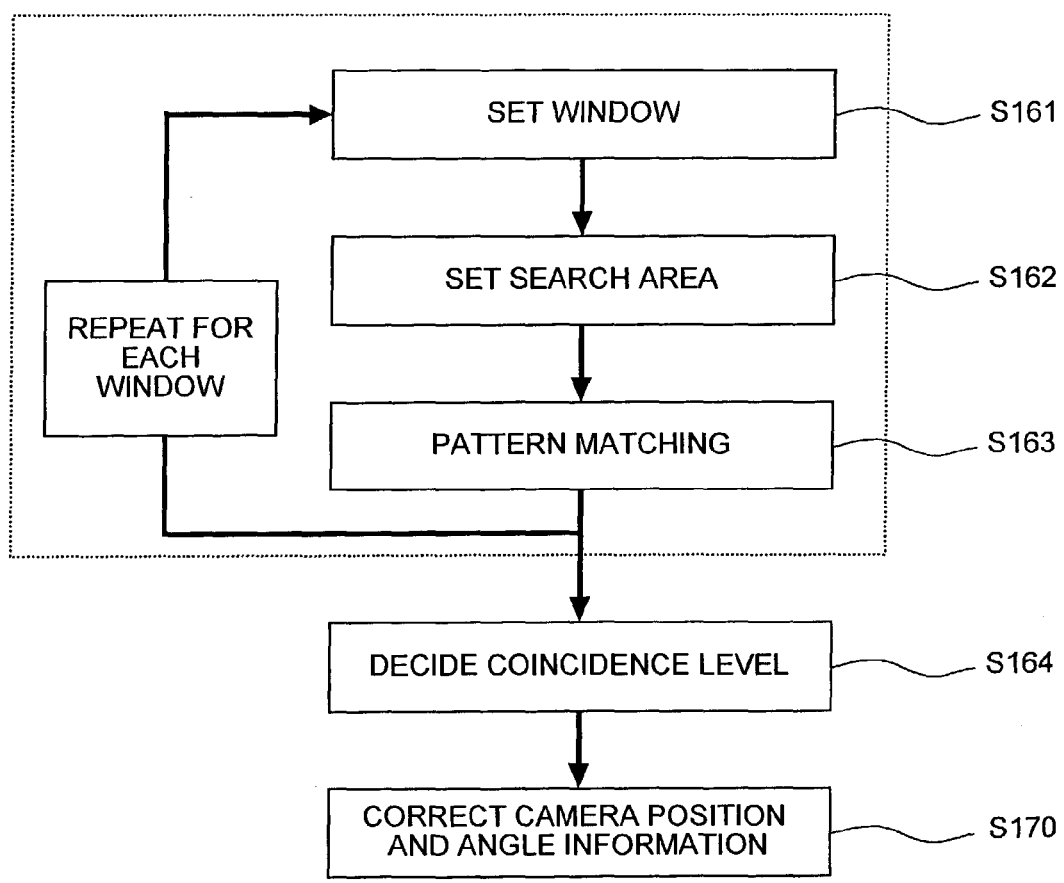
FIG. 8 is a flowchart that shows a processing procedure of a collating unit of the video navigation apparatus shown in FIG. 1.

The collating unit 28 collates the estimate image with the scenery image, and verifies whether the estimate values of position information and angle information are correct or not. In the verification processing by the collating unit 28, a processing procedure shown in FIG. 8 is executed.

In other words, first, a window for collating is defined in the estimate image (step S161). This window is defined as a small area using a point defined as a vertex, that is, a point corresponding to a corner of a road or a corner of a building, as a center.

A search area is defined in the scenery image (step S162). When the center of one window defined at step S161 is (u0, v0), an area slightly larger than the window is defined as a search area using the same position (u0, v0) at the scenery image side corresponding to this.

A position that matches most is searched for by gradually moving the image in the window of the estimate image in the search area of the scenery image. What is called a pattern matching is carried out (step S163). As an evaluation function for deciding whether a position matches or not, a mutual correlation coefficient can be utilized. When the coordinates of a position that matches most in the scenery image are (u0, v0), a difference between (u0, v0) and (u1, v1) becomes a yardstick for deciding correctness of the estimate values of position information and angle information. Such collation is carried out for several windows (in other words, steps S161 to S163 are repeated for each window). By totaling values of obtained differences of coordinates (for example, depending on whether an average value exceeds a preset threshold value or not), it is decided whether the estimate values of position information and angle information are correct or not (step S164).

In general, the processing for obtaining a set of points (corresponding points) corresponding to the same points from two cameras of which positions and angles are different from each other requires much calculation. Further, it has been known that it is not easy to obtain corresponding points sufficiently accurately from an optional image. However, according to this invention, the same processing is repeated in a predetermined period (for example, for each one second). Further, estimate values of position information and angle information obtained from a result of the last processing (for example, one second before) is utilized. Therefore, when the last processing result is correct, it is expected that a difference between the estimate values and actual values is not so large. Consequently, only the vicinity of the point may be searched for to search for the corresponding point, and it becomes possible to obtain the corresponding point in high precision with small calculation.

When the estimate values of position information and angle information are not correct (when there is an error in the estimate values of the information) at step S164, the position information and the angle information of the camera are corrected (step S170).

(7) Correcting Position and Angle Information (The Processing at Step S170)

The collating unit 28 corrects the position information and the angle information when it has been decided that there is an error in the estimate values of the position information and the angle information.

Figure 9:
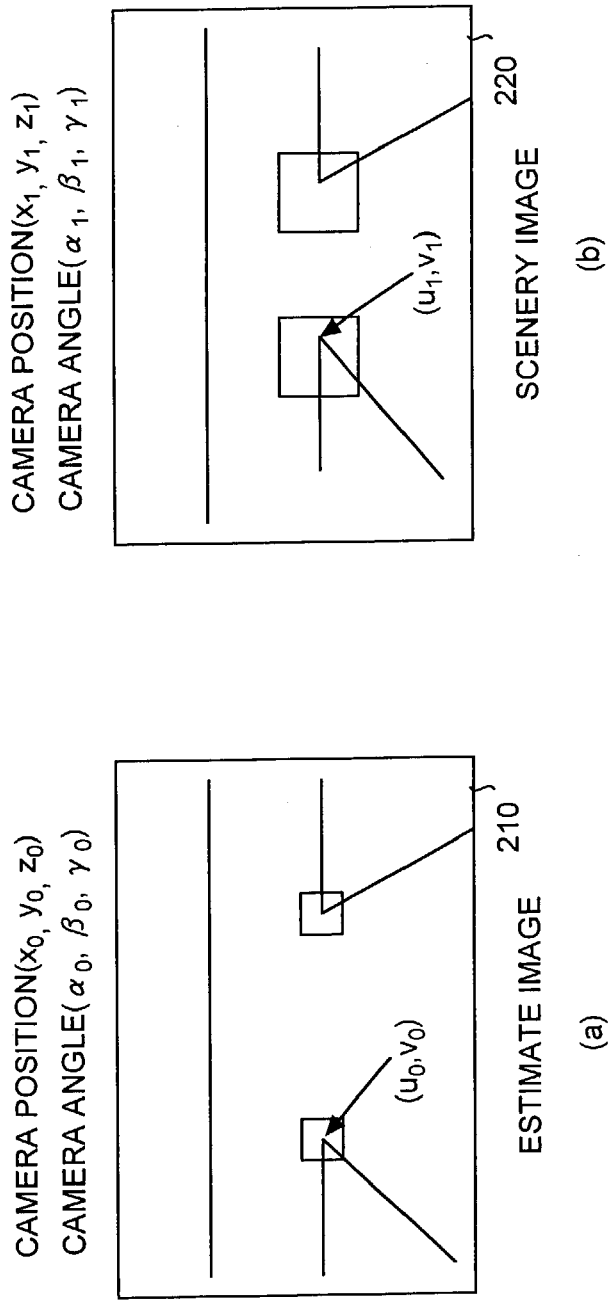
FIG. 9 is a diagram that explains a collation processing process of the collating unit of the video navigation apparatus shown in FIG. 1.

It is assumed that the estimate values of position information and angle information of the camera 10 are (x0, y0, z0) and ($\alpha$0, $\beta$0, $\gamma$0) respectively as shown in FIG. 9(a). From these estimate values and a result of a collation between an estimate image 210 and a scenery image 220, it becomes a target to determine (x1, y1, z1) and ($\alpha$1, $\beta$1, $\gamma$1) as position information and angle information of the camera 10 in the scenery image 220 respectively as shown in FIG. 9(b).

When the position sensor as the position and angle sensor 40 has sufficient precision and also when the error is negligibly small, a relational equation is established that position information (x1, y1, z1)=position information (x0, y0, z0).

It is assumed that the point (x, y, z) in the world coordinate system is at the point (u1, v1) in the scenery image 220 and at the point (u0, v0) in the estimate image 210. From the relationship between the world coordinates and the camera coordinates shown in FIG. 7, a relational equation shown in FIG. 9(c) is established between (u0, v0) and (u1, v1).

In the relational equation shown in FIG. 9(c), a camera constant f is a constant that can be known in advance by measuring. Therefore, when sets of sufficient number of corresponding points are obtained, it is possible to determine a matrix R based on the method of least squares or the like. As a result, it is possible to determine the target angle information ($\alpha$1, $\beta$1, $\gamma$1) of the camera 10.

When the position information and the angle information obtained in the processing are stored (overwritten) in the position and angle information storing unit 25, the error in the position information and the angle information is corrected. The corrected position information and angle information are used for the indication image generating unit 29 to process indication information and generate indication image. In addition, the corrected position information and angle information are used as reference values to obtain estimate values of position information and angle information of the camera 10 in the next period (for example, after one second).

(8) Generating and Displaying an Indication Image (The Processing at Step S180)

The indication image generating unit 29 processes the indication information, and embeds this information into the scenery image stored in the scenery image storing unit.

It has been known that the relational equation shown in FIG. 7(c) is established between the point (x, y, z) in the world coordinate system and the point (u, v) in the scenery image corresponding to this, as explained above.

Therefore, when the position information and the angle information of the camera 10 are obtained, it is possible to determine the coordinates (u, v) in the scenery image corresponding to the coordinates (x, y, z) in the given three-dimensional space.

Assume that a route "A $\rightarrow$ B $\rightarrow$ C" has been set as indication information and that coordinates in the world coordinate system have been given to each of the points A, B and C. When the relational equation shown in FIG. 7(c) is applied to each of these coordinates under the condition, it is assumed that coordinates (uA, vA), (uB, vB), and (uC, vC) are obtained in the scenery image. When these coordinates are connected with an arrow mark, route information 230 corresponding to the scenery image 220 is obtained (refer to FIG. 10).

Figure 10:
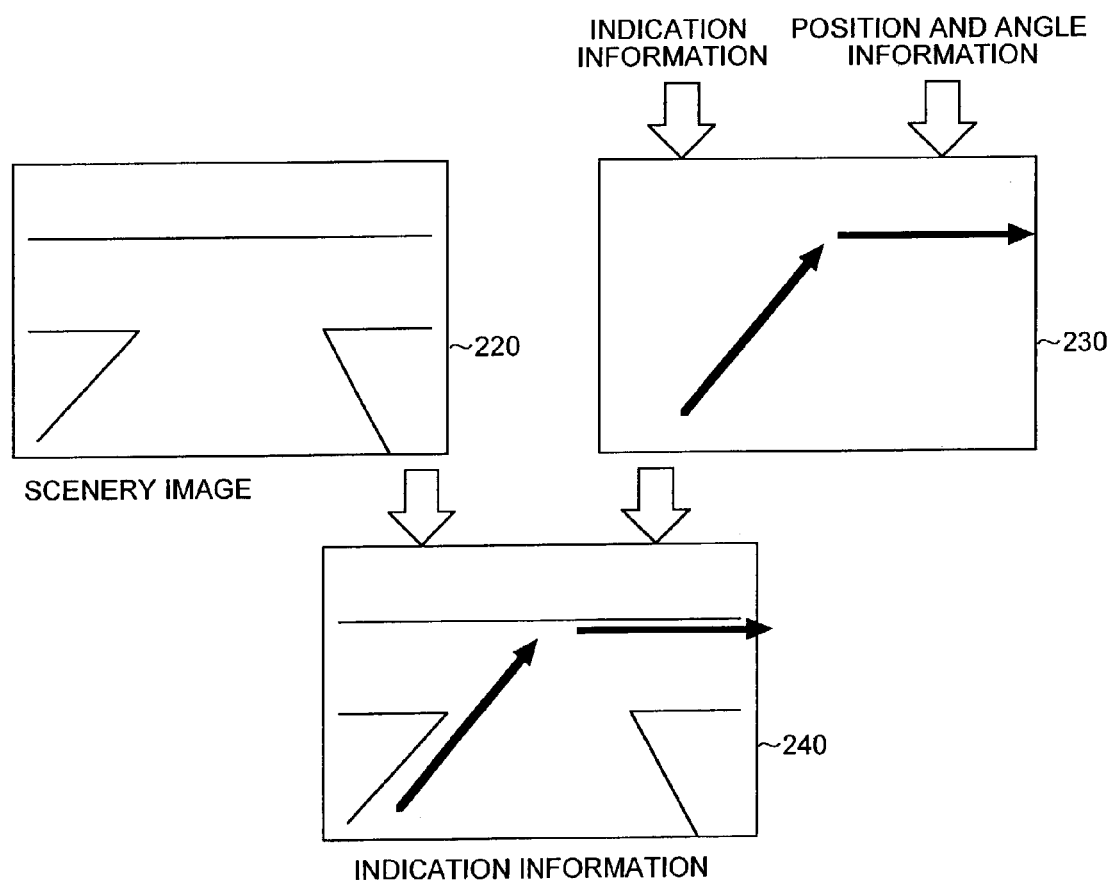
FIG. 10 is a diagram that explains an indication image generation processing process of an indication image generating unit of the video navigation apparatus shown in FIG. 1.

The indication image generating unit 29 generates an indication image 240 as shown in FIG. 10, by combining the route information as the indication information obtained in this way with the scenery image 220.

When the indication image generating unit 29 displays the scenery image (for example, the scenery image 220) embedded with the indication information (for example, the route information 230), namely indication image 240, in the display unit 30, a driver can accurately know a correct proceeding direction based on the indication information embedded in the scene that the driver is watching at present.

In the first embodiment, a mode that the video navigation apparatus is built in the vehicle and information is provided to the driver on board the vehicle has been explained. However, the present invention is not limited to this, and the video navigation apparatus may be built in a portable information terminal, and route guide information may be provided to a pedestrian who carries the portable information terminal.

In this case, a processing similar to the processing when the video navigation apparatus is built in the vehicle is carried out.

As explained above, according to the first embodiment, only a position sensor may be connected to an apparatus main body. Even when an angle sensor is not connected, it is possible to correctly understand a position and angles of a camera. Based on this, it is possible to generate an indication image that has indication information accurately embedded in a scenery image. As a result, it is possible to obtain a compact and light video navigation apparatus.

SECOND EMBODIMENT

A second embodiment of this invention will be explained. A video navigation apparatus relating to this embodiment has such a structure that, in the structure of the video navigation apparatus shown in FIG. 1, both an angle sensor and a position sensor are employed as the position and angle sensor 40, and these sensors are connected to an input and output data interface not shown via a cable not shown. The position sensor may not have higher precision than that of the first embodiment.

The angle sensor and the position sensor are employed as the position and angle sensor 40 for the following reason. Even when only a position sensor having relatively high precision is connected to a apparatus main body, it may not be possible to obtain sufficient precision depending on a kind of the position sensor. Therefore, when the precision of the position sensor is not so satisfactory, a position and angles of the camera 10 are estimated based on sensor information from both the angle sensor and the position sensor. A scenery image is collated with an estimate image based on a result of this estimate, and an error of the position sensor is corrected based on a result of this collation.

In the second embodiment, basically the same processing as that of the first embodiment is carried out. However, steps S130 and 170 of the processing procedure shown in FIG. 3 are slightly different from those of the first embodiment. Therefore, only the different points will be explained in detail.

(A) Estimating Position and Angle Information (The Processing at Step S130)

The position and angle information estimating unit 24 fetches sensor outputs of the position sensor and the angle sensor, and stores the outputs straight into the position and angle information storing unit 25 as estimate values, in principle. However, when it is not possible to satisfactorily obtain the output of the position sensor or the angle sensor depending on the situation, the estimate may be carried out based on the record of position information and angle information up to the present in a similar manner to that explained in the first embodiment.

(B) Correcting Position and Angle Information (The Processing at Step S170)

In this second embodiment, it is assumed that an error of the angle sensor may be disregarded. Then, a relational equation of angle information $(\alpha 1, \beta 1, \gamma 1)$=angle information $(\alpha 0, \beta 0, \gamma 0)$ is established. As, the angle information $(\alpha 1, \beta 1, \gamma 1)$ of the camera 10 is determined, it becomes a target to determine the position information (x1, y1, z1) of the camera 10.

It is assumed that the point (x, y, z) in the world coordinate system is at the point (u1, v1) in the scenery image 220 (refer to FIG. 11(b)), and is at the point (u0, v0) in the estimate image 210 (refer to FIG. 11(a)). When a relationship between the world coordinates and the camera coordinates shown in FIG. 7(c) is taken into account, a relational equation shown in FIG. 11(c) is established between (u0, v0) and (u1, v1).

In the relational equation shown in FIG. 11(c), a camera constant f is a constant that can be known in advance by measuring. Therefore, when sets of sufficient number of corresponding points are obtained, it is possible to determine the target angle information $(\alpha 1, \beta 1, \gamma 1)$ of the camera 10 based on the method of least squares or the like.

As explained above, according to the second embodiment, a position and angles of the camera 10 are estimated based on the sensor information from both the angle sensor and the position sensor. A scenery image is collated with an estimate image based on a result of this estimate, and an error of the position sensor is corrected based on a result of this collation. Therefore, it is not necessary to use a position sensor having high precision, and it is possible to obtain an advantage that the apparatus can be structured at low cost.

THIRD EMBODIMENT

Figure 12:
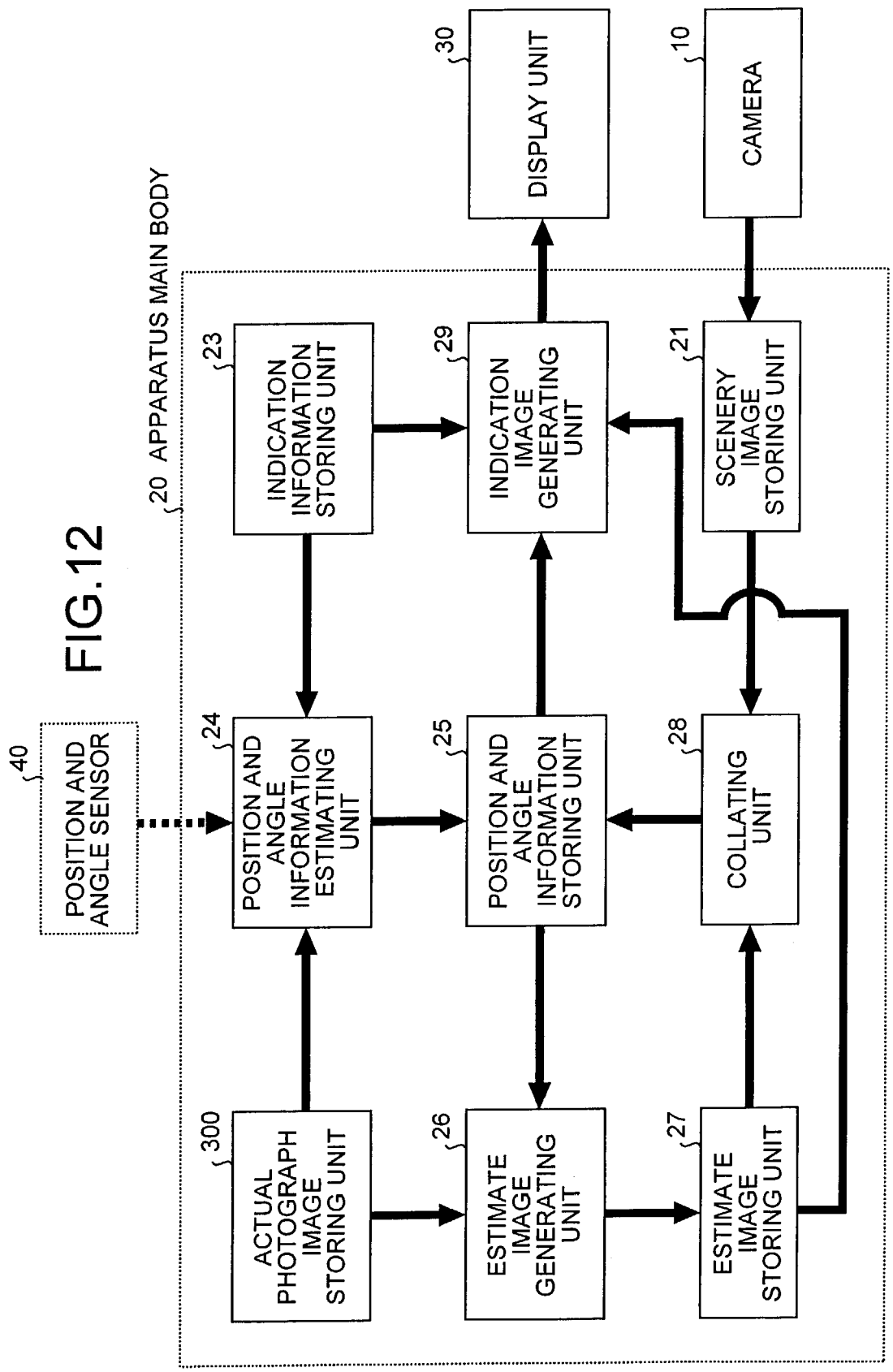
FIG. 12 is a block diagram that shows a video navigation apparatus as a third embodiment of this invention.

A third embodiment of this invention will be explained. FIG. 12 shows a structure diagram of a video navigation apparatus relating to the third embodiment. The video navigation apparatus relating to this third embodiment has such a structure that, in the structure of the video navigation apparatus shown in FIG. 1, the space information storing unit 22 is deleted, and an actual photograph image storing unit 300 is added. In FIG. 12, portions that achieve functions similar to those of the constituent elements shown in FIG. 1 are attached with the same symbols.

The actual photograph image storing unit 300 stores in advance position information and angle information of a camera 10 and an actual photograph image photographed at this position as a set. The actual photograph image storing unit 300 stores actual photograph images photographed at a plurality of points in advance.

The position information, the angle information, and the actual photograph image are stored as a set in advance, for the following reason. In a mode that three-dimensional space information is prepared in advance using the method used in the field of computer graphics, and an estimate image is prepared based on the space information and estimate values of a position and angles of a camera like in the first and second embodiments, it requires much work to prepare the three-dimensional space information over a wide range of guiding a route. Therefore, data for guiding a route is prepared with relatively little work.

While it is possible to apply this third embodiment to both a vehicle-mounted information terminal (a mode that a video navigation apparatus is built in a vehicle) and a portable information terminal, a portable information terminal that provides guidance information to a pedestrian is assumed here.

Figure 13:
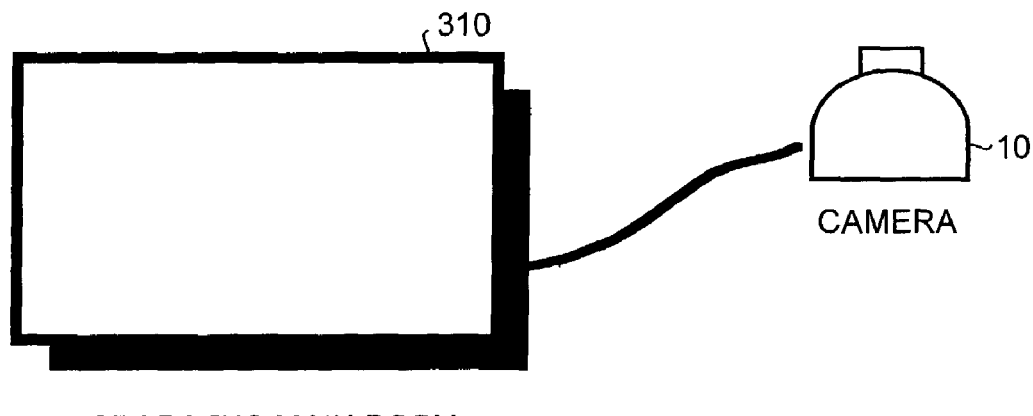
FIG. 13 is an appearance view that shows a schematic appearance of the video navigation apparatus as the third embodiment of this invention.

It is assumed that the portable information terminal has a apparatus main body 20 and a display unit 30 integrated together (has a apparatus main body and display unit 310) as shown in FIG. 13. A camera 10 is separate from the apparatus main body 20, and is fitted to a hat, or glasses, or clothes of a pedestrian so that it can always fetch a scenery in front of the pedestrian. In order to make the apparatus (the apparatus main body and display unit 310) small, a frame glover as the scenery image storing unit 21 is not inserted into the apparatus main body 20, but the camera 10 directly generates a digital image and transfers this image to the apparatus main body 20 as digital image data. It is possible to freely change a direction of the camera 10 based on an indication from the apparatus main body 20, and can maintain a predetermined direction regardless of the move of the pedestrian.

Figure 14:
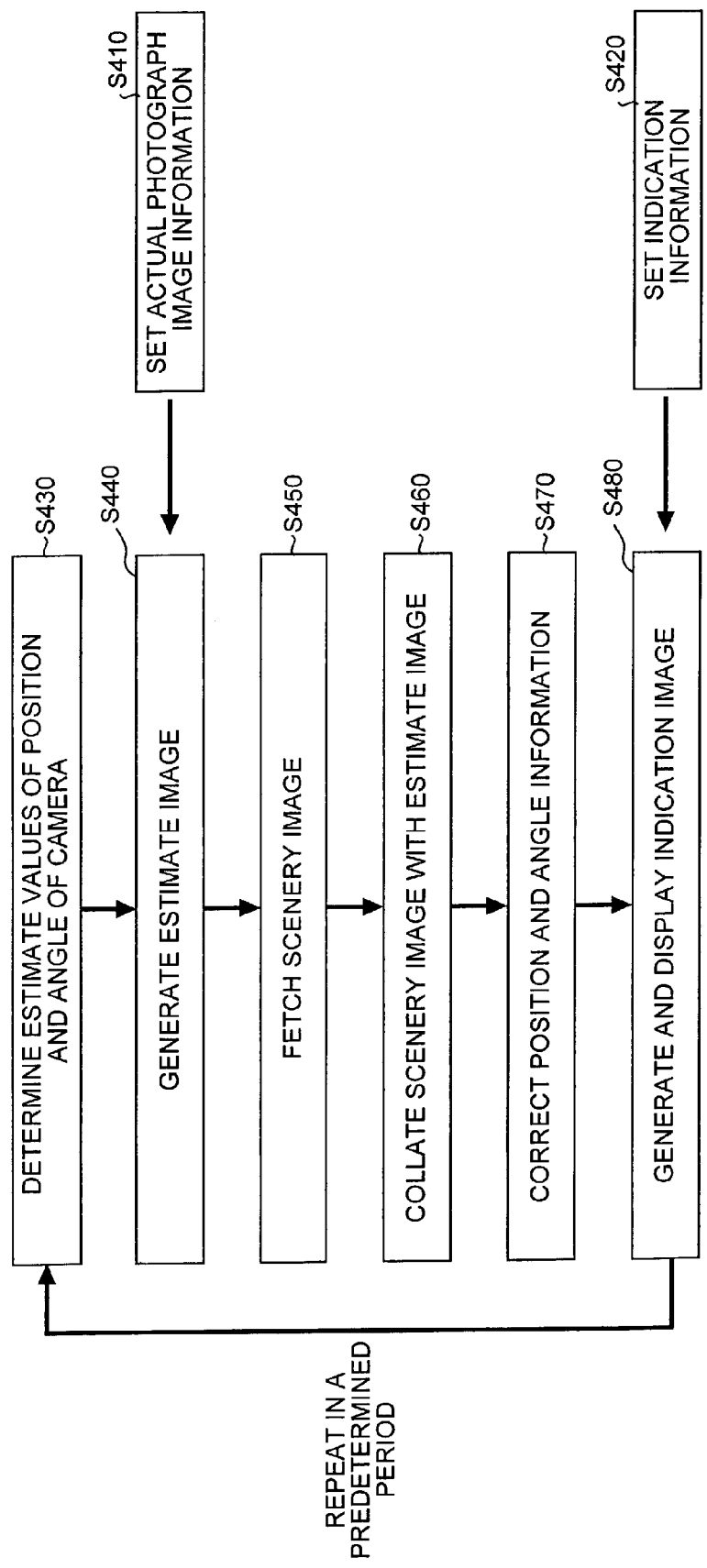
FIG. 14 is a flowchart that shows a processing procedure of the video navigation apparatus shown in FIG. 12.

The processing operation of the video navigation apparatus will be explained with reference to FIG. 14. The video navigation apparatus sets an actual photograph image to the actual photograph image storing unit 300 (step S410), and sets indication information to an indication information storing unit 23 (step S420). A position and angle information estimating unit 24 determines estimate values of a position and angles of the camera 10 based on route information set as indication information, a current position information of a pedestrian, and actual photograph image information stored in the actual photograph image storing unit 300, and stores these pieces of information into a position and angle information storing unit 25 (step S430).

An estimate image generating unit 26 selects an actual photograph image corresponding to the estimate values of a position and angles of the camera 10 from the actual photograph image storing unit 300, and stores this into an estimate image storing unit 27 as an estimate image (step S440).

The camera 10 fetches an image in a predetermined period such as once per one second, and transfers it to the apparatus main body 20. The apparatus main body 20 stores the transferred image into a scenery image storing unit 21 (step S450). A collating unit 28 collates an estimate image (an actual photograph image in actual practice) stored in the estimate image storing unit 27 with a scenery image stored in the scenery image storing unit 21, and verifies whether the estimate values of position and angle information are correct or not (step S40). When it has been decided that there is an error in the estimate values of position and angle information as a result of the verification, the collating unit 28 corrects the position information and angle information stored in the position and angle information storing unit 25 (step S470).

An indication image generating unit 29 processes the indication information stored in the indication information storing unit 23 based on the corrected position information and angle information stored in the position and angle information storing unit 25. At the same time, the indication image generating unit 29 embeds the processed indication image into an estimate image, that is, an actual photograph image, stored in the estimate image storing unit 27 to generate an indication image, and displays this indication image in a display unit 30 (step S480).

Processing contents of the processing procedure that shows the processing operation of the video navigation apparatus will be explained in detail.

(1) Setting Actual Photograph Image (The Processing at Step S410)

Along a route to guide a pedestrian, points are selected and photographed at intervals of about 10 meters for example, and these are collected as actual photograph images. It is preferable that characteristic objects are selected as photographing points such as billboards, buildings, and monuments so that they come into the field of vision during the walking.

Figure 15:
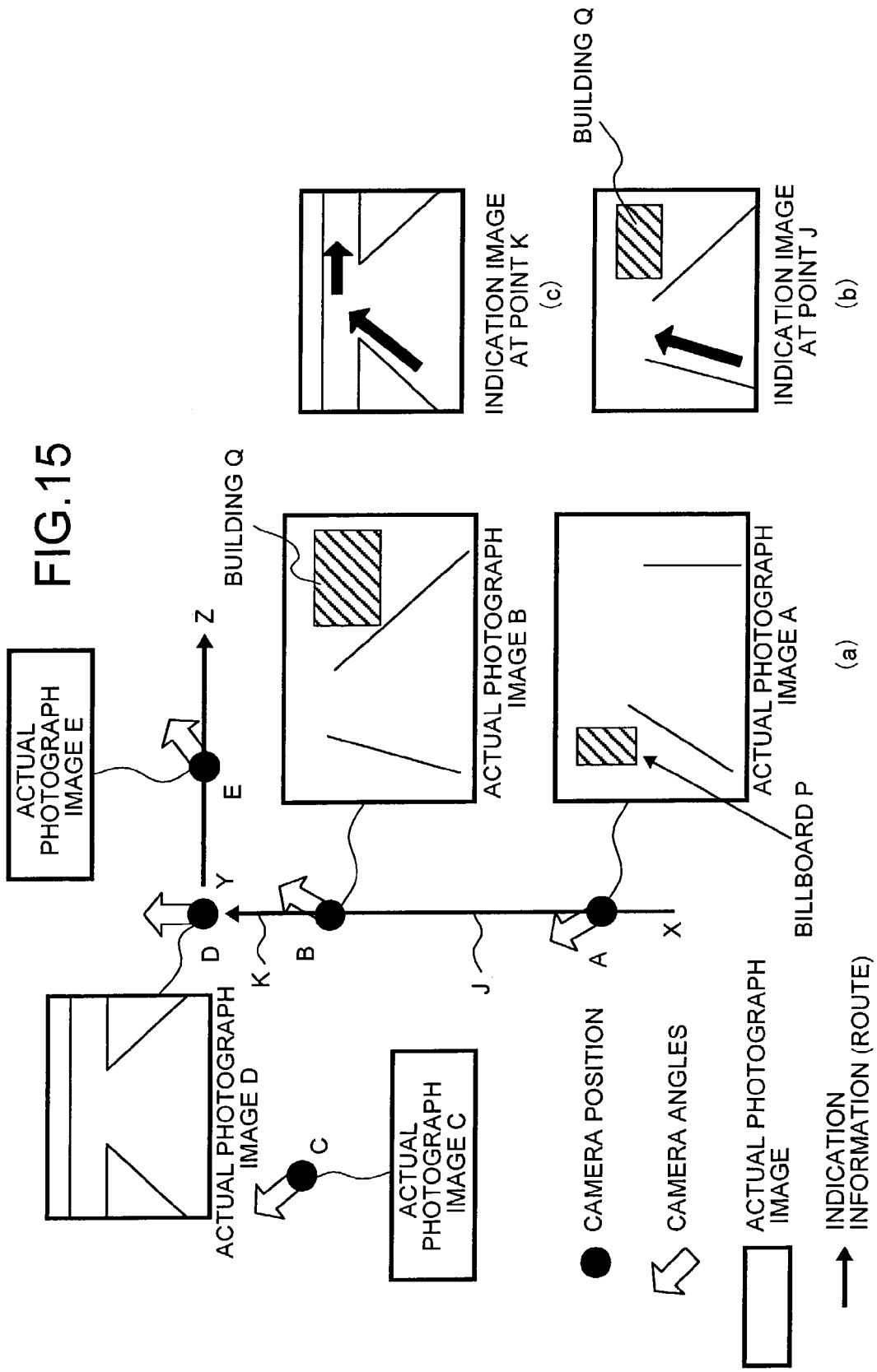
FIG. 15 is a diagram that explains a fetch processing of a scenery image, and generation and display processing of an indication image by the video navigation apparatus shown in FIG. 12.

FIG. 15(*a*) shows an example of a setting of an actual photograph image. In this example, photographing is carried out at five points of points A to E, and an actual photograph image, and indication information and angle information of the camera 10 at each point are stored as a set into the actual photograph image storing unit 300. In this example, the position and angles of the camera 10 are adjusted so that a billboard P and a building Q come into the field of vision as targets at the point A and the point B respectively.

It is also possible to move along a route with a video camera, takes out a suitable image from video images obtained, and use this as an actual photograph image.

Position information and angle information of the camera 10 are recorded at the same time as the photographing, and these pieces of information are stored into the actual photograph image storing unit 30 together with the actual photograph image as a set. It is possible to obtain position information and angle information of the camera 10 by recording the outputs of the position sensor and the angle sensor at the photographing time, for example.

(2) Setting Indication Information (The Processing at Step S420)

The processing is similar to that of the first embodiment, and therefore, explanation of this will be omitted.

(3) Estimating Position and Angle Information (The Processing at Step S430)

The position and angle information estimating unit 24 estimates a position and angles based on route information set as indication information, a current position information of a pedestrian, and actual photograph image information stored in the actual photograph image storing unit 300.

A current position and angles of the camera 10 are not estimated, but a point that the pedestrian sets as the next target is selected from among points to which actual photograph image have been set. The position information and angle information of the camera 10 corresponding to the actual photograph image at the selected point are set as estimate values.

For example, in the example shown in FIG. 15(*a*), when a pedestrian exists at a point J between the point A and the point B at present, and also when a route "X → Y → Z" has been set as indication information, a point that becomes the next target becomes the point B among points at which actual photograph points exist. Therefore, the position information and the angle information of the camera 10 at the pint B are set as estimate values, and are stored into the position and angle information storing unit 25.

(4) Generating an Estimate Image (The Processing at Step S440)

The estimate image generating unit 26 selects an actual photograph image corresponding to the estimate values of the position information and angle information of the camera 10 from the actual photograph image storing unit 300, and sets this image as an estimate image.

For example, in the example shown in FIG. 15(*a*), when a pedestrian exists at the point J between the point A and the point B at present, the estimate values of the position information and angle information of the camera 10 become values corresponding to the actual photograph image B. Therefore, the actual photograph image B is selected as an estimate image, and this is stored into the estimate image storing unit 27.

(5) Fetching a Scenery Image (The Processing at Step S450)

The camera 10 fetches an image in a predetermined period such as once per one second, and transfers it to the apparatus main body 20. The apparatus main body 20 store the transferred image into the scenery image storing unit 21.

When the camera 10 is used by mounting it on the pedestrian, there is a problem that a direction of the camera 10 is stabilized. Further, as an actual photographing image is used as an estimate image in the third embodiment, it is not possible to generate an estimate image at an optional position and angles. Therefore, in order to make it possible to freely change the position of the camera 10 based on an indication from the apparatus main body 20 regardless of a posture and a direction of the pedestrian, the direction of the camera 10 is controlled so that the angles become equal to the estimate values based on the estimate processing by the position and angle information estimating unit 24.

By controlling the direction of the camera 10 in this way, compositions of the scenery image and the estimate image approximately coincide with each other when the pedestrian reaches the next target point.

Figure 16:
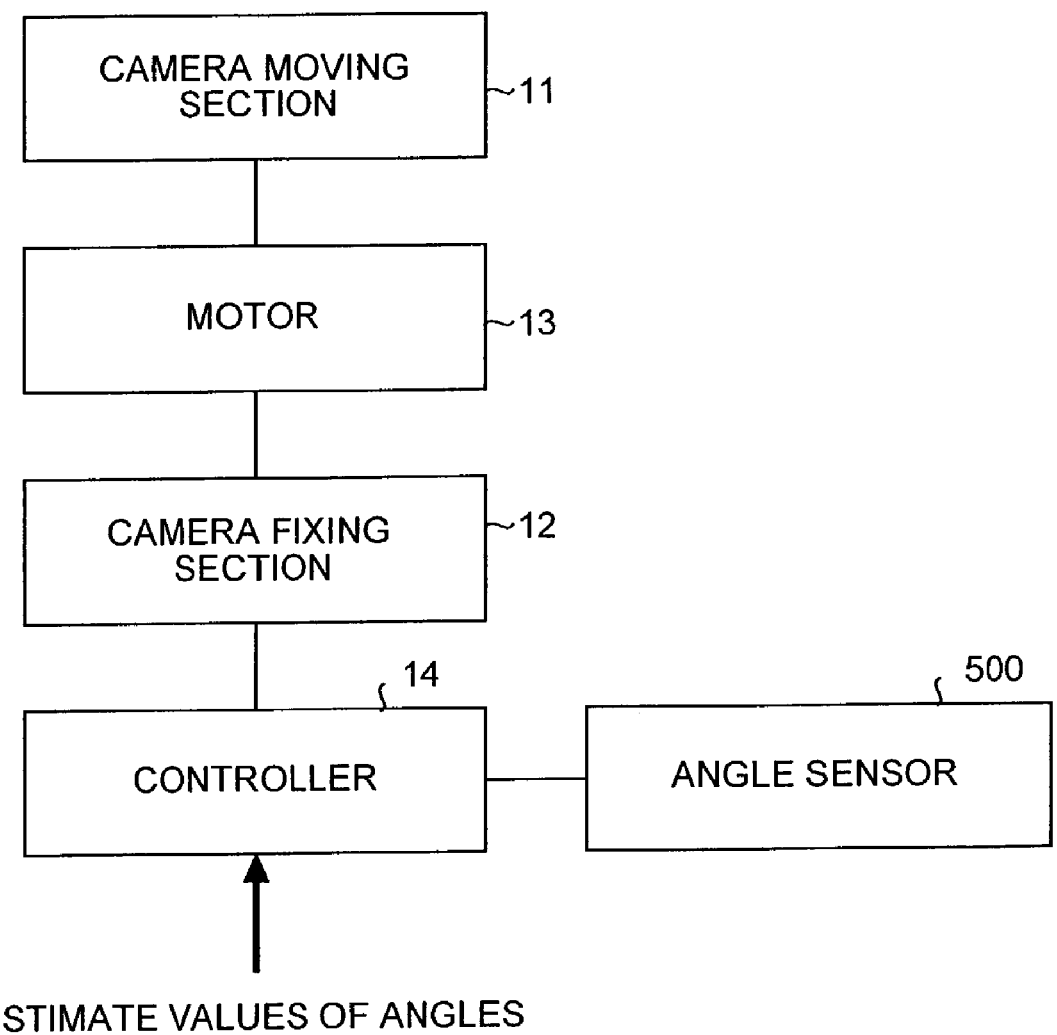
FIG. 16 is a block diagram that shows a structure of a camera of the video navigation apparatus shown in FIG. 12.

FIG. 16 shows a structure diagram of the camera 10 to realize the control of the direction of the camera 10.

The camera 10 is divided into a camera movable section 11 and a camera fixing section 12. A pedestrian fixes the camera fixing section 12 to clothes, a hat, or glasses. The camera movable section 11 includes a lens portion, and is set to be able to change a photographing direction with a motor 13. Ideally, it is preferable to be able to freely change directions of three axes of pan, tilt, and rotate of the camera 10 respectively. An angle sensor 500 is provided in the camera fixing section 12 of the camera 10, and a sensor output of this angle sensor 500 is input to a controller 14.

Figure 17:
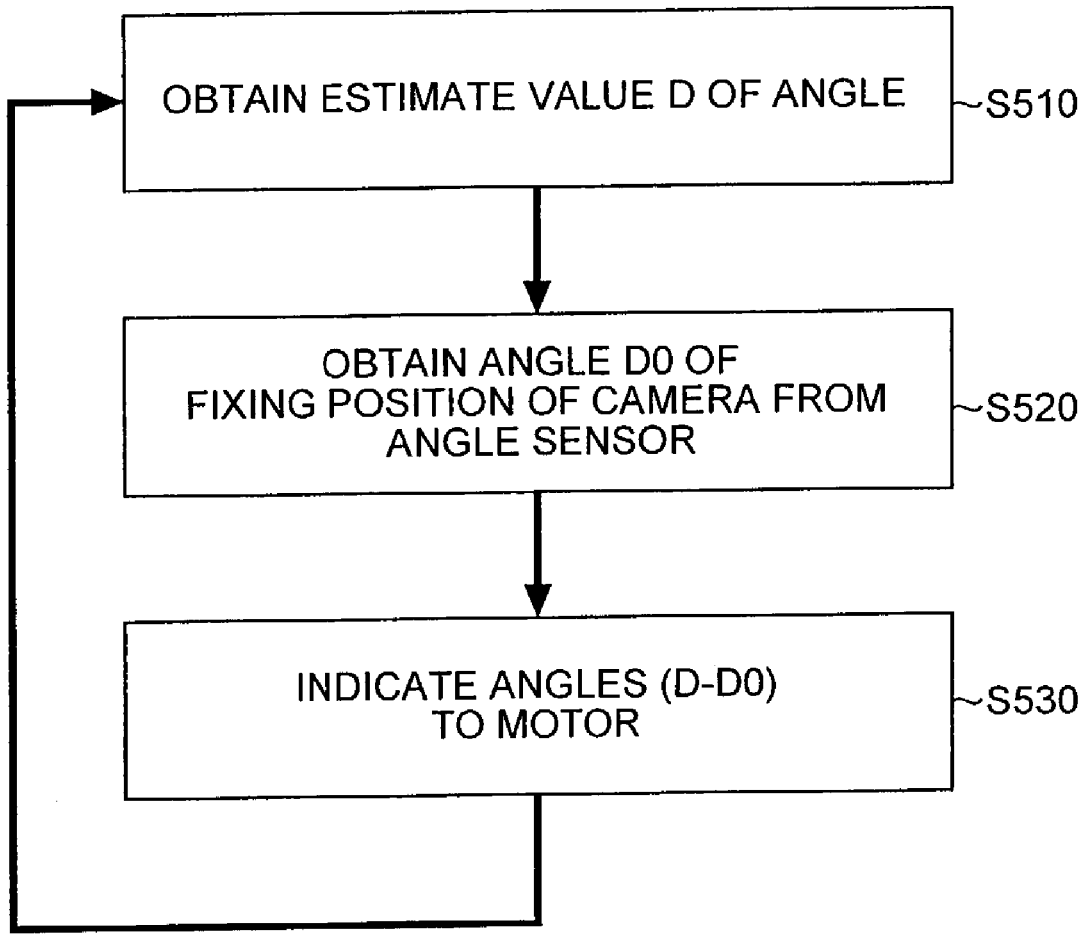
FIG. 17 is a flowchart that shows a processing procedure of a controller that control the camera shown in FIG. 16.

The control processing of a direction of the camera 10 with the controller 14 will be explained with reference to FIG. 17.

The controller 14 obtains estimate values of angles (that is, angles of the camera at which it is possible to obtain a scenery image that coincides with an actual photograph image at the next target point) from the position and angle information storing unit 25 (step S510), and controls the direction of the camera 10 based on this.

It is assumed that estimate values of angles are d=($\alpha$, $\beta$, $\gamma$). The estimate values d are angles based on the world coordinate system. The motor 13 of the camera 10 controls angles of the camera movable section 11 based on the angles of the camera fixing section 12. When a direction and a posture of the pedestrian change, the angles of the camera fixing section 12 change according to these changes. Therefore, it is necessary to know current angles of the world coordinate system of the camera fixing section 12. For this purpose, the controller 14 obtains a sensor output (angle information) of the angle sensor 500 provided in the camera fixing section 12.

The controller 14 obtains an angle d0 measured by the angle sensor 500 from the camera fixing section 12 (step S520), and controls the motor 13 so that the angles of the camera movable section 11 become angles after subtracting the angle d0 from the estimate values d, that is, angles of values after carrying out the calculation of "d−d0" (step S530).

The controller 14 sequentially calculates the angles of the (d−d0), and indicates the angles to the motor 13 (repetition of steps S510 to S530). The motor 13 adjusts the angles of the camera movable section 11 according to this indication. Therefore, the photographing direction of the camera 10 is controlled to face always a desired direction.

(6) Collating a Scenery Image with an Estimate Image (The Processing at Step S460)

The collating method is substantially similar to that of the first embodiment. However, as the estimate image is not generated from space information but is an actual photograph image, it is necessary to consider how to set a window that becomes a reference of the collation. For this purpose, there is a method of extracting pixels having a large difference in the brightness from that of the surrounding pixels as a characteristic point according to an image processing, and carrying out collation using an area around this characteristic point as the window.

The collating unit 28 notifies the pedestrian of a level of coincidence between a scenery image and an estimate image obtained as a result of the collation, with sound or the like. This is realized by changing a tone of the sound according to the level of coincidence obtained as a result of the collation. The pedestrian behaves so as to improve the coincidence level as far as possible while listening to the notification sound of the coincidence level notified periodically. The pedestrian can become confident that the self is proceeding to a right direction by gradually improving the coincidence level based on the notification sound. On the other hand, when the coincidence level does not improve, the pedestrian can quickly notice an error by confirming the route again.

As methods of obtaining a level of coincidence between a scenery image and an estimate image, the following two methods will be explained.

A first method is based on a positional deviation between corresponding points on an image plane surface. As explained in the first embodiment, when positions and angles of the camera coincide with each other respectively between the scenery image and the estimate image, a deviation between the corresponding point (u0, v0) and the corresponding point (u1, v1), that is a result of calculating "the corresponding point (u0, v0)—the corresponding point (u1, v1)" (a deviation of positions) becomes close to 0. However, when the positions and the angles of the camera do not coincide with each other respectively, a positional deviation occurs. Therefore, an average value of distances between corresponding points for all sets of corresponding points is defined as a coincidence level.

A second method is based on a deviation of a camera position. A camera position of a scenery image is estimated based on a method similar to the method of correcting position information and the angle information in the second embodiment. A distance between this camera position and a camera position of the estimate image is defined as a coincidence level.

According to any one of these methods, when the scenery image substantially completely coincides with the estimate image, a value that shows the coincidence level becomes close to about 0. On the other hand, when a deviation becomes larger, a value that shows the coincidence level becomes larger. Therefore, by notifying the pedestrian of a value that shows this coincidence level or a change of this value, it becomes possible to urge the user to behave so that the coincidence level improves, that is, so that a value that shows the coincidence level decreases.

As methods of notifying a pedestrian of a coincidence level, the following two methods will be explained. A first method is a method of notifying the pedestrian of large or small of a coincidence level. In other words, a tone of a notification sound, for example, is corresponded to a value that shows the coincidence level. The pedestrian can decide whether the self is proceeding to a right direction or not based on a change of the tone. A second method is a method of notifying the pedestrian of a change of a coincidence level. In other words, notification sound having different tones are prepared, that is a notification sound "Right" (a notification sound that shows right) and a notification sound "Wrong" (a notification sound that shows wrong). When the coincidence level has improved from that of the last period (for example, one second before), the notification sound "Right" is generated, and when the coincidence level has not improved, the second notification sound "Wrong" is generated. With this arrangement, the pedestrian can decide whether the self is proceeding to a right direction or not based on the tone.

(7) Correcting Position and Angle Information (The Processing at Step S470)

The collating unit 28 can know whether the estimate values of position information and angle information are correct or not by evaluating the coincidence level obtained as a result of collating the scenery image with the estimate image. The position information and the angle information are updated when it has been decided that the actual position of the pedestrian coincides with the estimate values as a result of the behavior of the pedestrian to make large the level of coincidence between the scenery image and the estimate image. In this updating, the estimate values become values of a point that becomes the next target point of the pedestrian.

For example, when the pedestrian has reached the point B in the example shown in FIG. 15(a), the estimate values of position information and angle information are updated at this point of time to estimate values corresponding to an actual photograph image D. In the next period, the processing is carried out using the point D as a new target point.

(8) Generating and Displaying an Indication Image (The Processing at Step S480)

Indication information may be embedded into a scenery image and displayed in a method similar to that of the first embodiment. However, in the third embodiment, position information and angle information are not corrected during each processing period, but the pedestrian re-sets the position information and angle information when the pedestrian has reached a position at which the actual photograph image exists. Therefore, position information and angle information do not coincide with the current scenery image but coincide with an actual photograph image at the next target position of the pedestrian. Therefore, in the third embodiment, the indication image is displayed by embedding indication information into an estimate image, that is, an actual photograph image prepared in advance, not a scenery image.

In the examples shown in FIGS. 15(b) and (c), an arrow mark is embedded into an actual photograph image based on indication information, and is displayed. For example, in the example shown in FIG. 15(b), an indication image that has an arrow mark generated based on the indication information embedded into the actual photograph image B is displayed.

As explained above, according to the third embodiment, a route is guided to the pedestrian by collating the actual photograph image prepared in advance with the current scenery image. Therefore, it is not necessary to prepare three-dimensional space information, and consequently, it becomes possible to prepare data for guiding a route with relatively little work.

According to the third embodiment, a pedestrian can visually know a target object that becomes a mark at the next target position, and a proceeding direction at this point.

According to the third embodiment, notification information such as sound is notified to a pedestrian based on a result of collating the current scenery image with the actual photograph image at the next target point. Therefore, the pedestrian can proceed while sequentially confirming that the self is approaching the target point.

FOURTH EMBODIMENT

A fourth embodiment of this invention will be explained. A structure of a video navigation apparatus relating to the fourth embodiment is basically similar to the structure of the video navigation apparatus relating to the first embodiment shown in FIG. 1 or the structure of the video navigation apparatus relating to the third embodiment shown in FIG. 12. However, the scenery image storing unit 21 can store a series of scenery images, and the position and angle information storing unit 25 can store a series of position information and angle information. It is assumed that the structure of the video navigation apparatus relating to the fourth embodiment is similar to that of the video navigation apparatus relating to the first embodiment shown in FIG. 1.

In the first to third embodiments, position information and angle information are corrected by collating one piece of estimate image with one piece of scenery image. On the other hand, in the fourth embodiment, a plurality of estimate images and scenery images are prepared respectively, and a collating processing is carried out using these images. With this arrangement, it can be expected to obtain higher collation precision.

Figure 3:
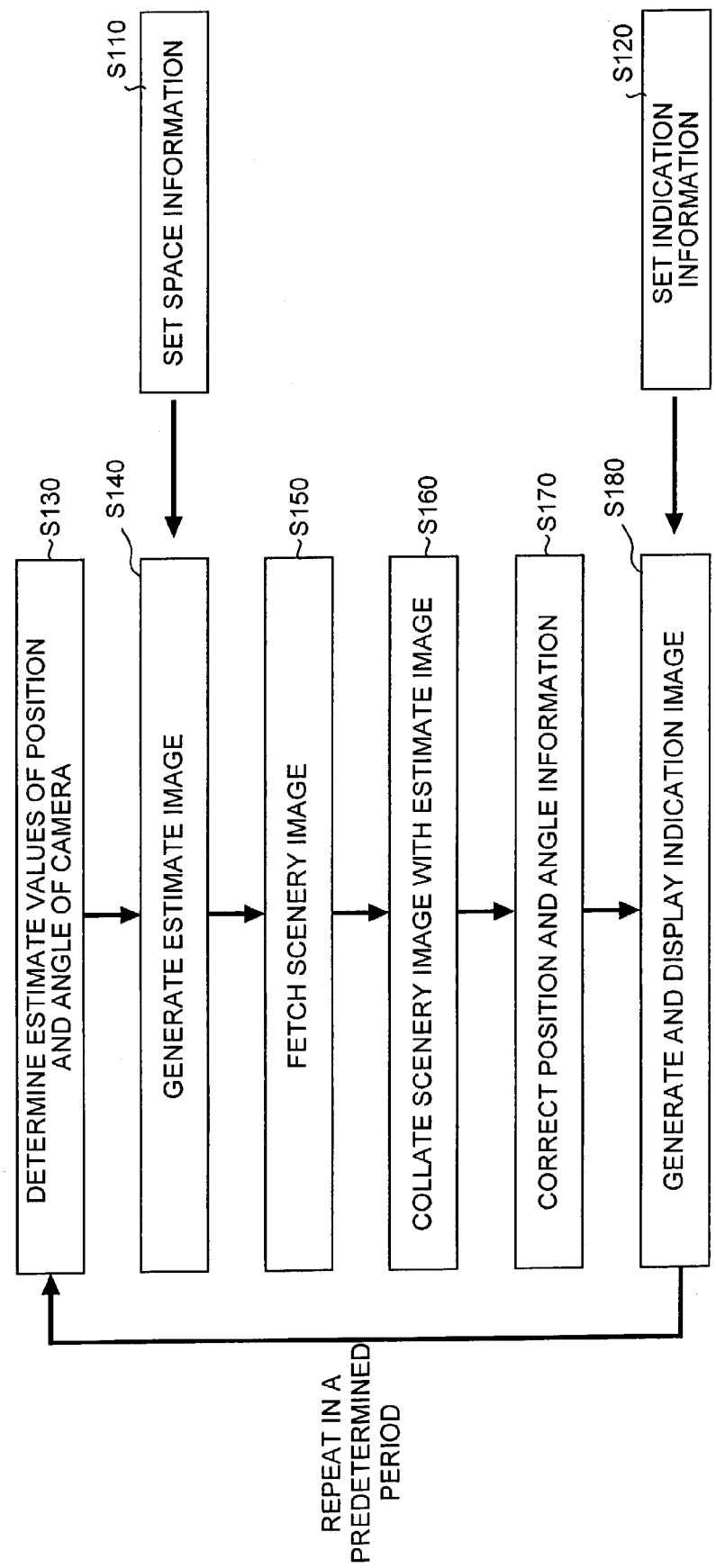
FIG. 3 is a flowchart that shows a processing procedure of the video navigation apparatus shown in FIG. 1.

In the fourth embodiment, basically, a processing similar to that of the first embodiment shown in FIG. 3 is carried out. However, the processing at steps S130, S150, and S160 in the processing procedure are different. The different points will be explained next.

(A) Estimating Position and Angle Information (The Processing at Step S130)

The position and angle information estimating unit 24 estimates position information and angle information and stores these pieces of information into the position and angle information storing unit 25 in a similar manner to that of the first embodiment. The position information and angle information are estimated once per one second, for example, and a series of position information and angle information during the past ten seconds for example are always held.

(B) Fetching a Scenery Image (The Processing at Step S150)

A video signal is fetched from a frame glover in a predetermined period such as once per one second, and is stored into the scenery image storing unit 21. For the scenery image, scenery images during the past ten seconds for example are always held.

(C) Collating a Scenery Image with an Estimate Image (The Processing at Step S160)

The collating unit 28 first collates a scenery image corresponding to the latest time with an estimate image, and corrects position information and angle information in a method similar to that of the first embodiment. Next, the collating unit 28 evaluates a series of corrected position information and angle information by taking into account the characteristic that a vehicle usually proceeds at a constant speed. In other words, the series of corrected position information and angle information are checked, and when it can be regarded that the vehicle is proceeding at substantially a constant speed, it is decided that the series of position information and angle information are correct. On the other hand, when a rapid change in the speed and a change in the direction are observed, it is decided that there is an error in the series of position information and angle information.

When the collating unit 28 has decided that there is an error in the series of position information and angle information, the collating unit collates again the scenery image with the estimate image. In other words, it is checked whether there are other candidates in the method of obtaining a corresponding point, and when other candidates have been found, the position information and angle information are corrected based on the set of the corresponding points.

When it is not possible to obtain a satisfactory series of position information and angle information despite the collation processing carried out again, the collation processing is carried out again along the past suitable series, for example, along a retroactive series of a set of position information and angle information and scenery images of one second before.

When position information and angle information have been corrected by error at a certain point of time, there is a risk that the subsequent processing all results in error affected by this error. Therefore, it is effective to correct errors retroactively.

It becomes possible to carry out this processing when a series of scenery images and a series of position information and angle information are held during a predetermined period up to the present.

As explained above, according to the fourth embodiment, when a series of position information and angle information do not satisfy a predetermined condition, the collating unit 28 collates estimate images with scenery images again by tracing back the series. Therefore, it becomes possible to improve the correction precision of position information and angle information.

FIFTH EMBODIMENT

A fifth embodiment of this invention will be explained. A structure of a video navigation apparatus relating to the fifth embodiment is basically similar to those of the first to fourth embodiments.

In the first to fourth embodiments, the indication image generating unit 29 carries out a processing based on position information and angle information for each of all indication information related to a specific position in the space, and generates an indication image. Therefore, all pieces of indication information existing in the field of vision of the camera 10 are embedded in the indication image. However, when a large number of pieces of indication information are related within the space, there is a problem that it becomes difficult to look at the image as the large number of pieces of indication information are displayed in the indication image.

Therefore, in the fifth embodiment, the indication image generating unit 29 selects indication information based on a distance between the camera 10 and a position corresponding to the indication information, and angle information, and generates an indication image.

The processing operation according to the fifth embodiment will be explained. The processing other than the processing (A) shown below is similar to that of the first to fourth embodiments.

(A) Generating and Displaying an Indication Image

The indication image generating unit 29 decides whether each piece of indication information related to a specific position in the space is displayed according to the following method or not. Only the indication information that has been decided to be displayed is embedded into the indication image and displayed in a similar manner to that of the first to fourth embodiments.

A decision about whether the indication information is displayed or not is carried out as follows. The indication information is related to a specific position within a space in advance, and this position (x, y, z) can be obtained from the indication information storing unit 23. Position information (x0, y0, z0) and angle information (α, β, γ) of the camera 10 can be obtained from the position and angle information storing unit 25. It is possible to obtain a distance d from the camera 10 to a position corresponding to the indication information, form these pieces of information. It is also possible to obtain an angle θ between a direction of a straight line drawn from the camera position (x0, y0, z0) to the position (x, y, z) of the indication information and a direction of the camera view line.

For example, indication information that satisfies a condition that the distance d is within 30 meters and the angle θ is within 60 degrees is displayed, and other indication information is not displayed.

It is also considered possible not to display indication information of the other side of a structure on the space such as a building. A position of a structure on the space is stored in the space information storing unit. Therefore, it is decided whether or not a structure exists between the camera position (x0, y0, z0) and the position (x, y, z) corresponding to the indication information. When a structure exists, indication information is not displayed.

As explained above, according to the fifth embodiment, it is possible to reduce the indication information to be displayed and generate an indication screen that can be looked at easily, by taking into account a distance between the camera 10 and a position corresponding to the indication information, angle information, the camera 10, indication information, and a positional relationship of a structure on the space.

In the first to fifth embodiments, it is assumed that a usual visible camera is used as the camera 10 to photograph a scenery image. However, the present invention is not limited to this, and it is also possible to use an infrared camera by taking into account the use at night. It is also possible to use an ultrasonic sensor or a millimeter wave radar.

SIXTH EMBODIMENT

Figure 18:
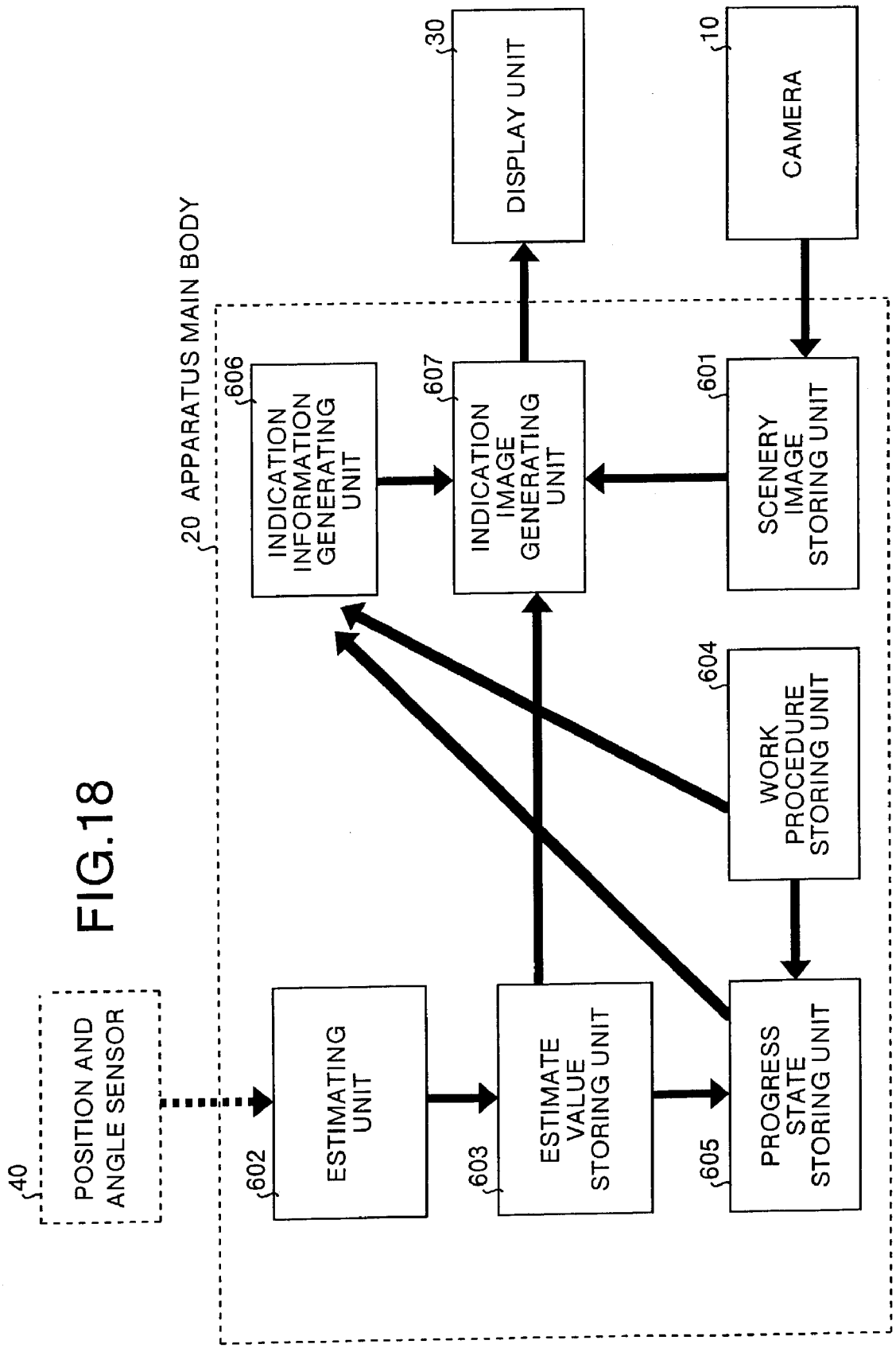
FIG. 18 is a block diagram that shows a structure of a video navigation apparatus as a sixth embodiment of this invention.

A sixth embodiment of this invention will be explained. FIG. 18 shows a structure diagram of a video navigation apparatus relating to the sixth embodiment. Like in the first embodiment shown in FIG. 1, this video navigation apparatus is constructed of a camera 10, a apparatus main body 20, a display unit 30, and a position and angle sensor 40. The apparatus main body 20 is constructed of a scenery image storing unit 601, an estimating unit 602, an estimate value storing unit 603, a work procedure storing unit 604, a progress state storing unit 605, an indication information generating unit 606, and an indication image generating unit 607.

The scenery image storing unit 601, the estimating unit 602, and the estimate value storing unit 603 have functions similar to those of the scenery image storing unit 21, the position and angle information estimating unit 24, and the position and angle information storing unit 25 shown in FIG. 1 respectively.

The work procedure storing unit 604 stores work procedure information that shows a work procedure. The progress state storing unit 605 stores progress state information that shows a progress state of the work. The indication information generating unit 606 generates indication information based on work procedure information stored in the work procedure storing unit 604 and progress state information stored in the progress state storing unit 605. The indication image generating unit 607 processes indication information generated by the indication information generating unit 606 based on position information that shows a position and angle information that shows angles of the camera 10 stored in the estimate value storing unit 603, and generates an indication image.

The apparatus main body 20 is constructed of a computer that includes a CPU and a storing unit like in the first embodiment. The apparatus main body 20 may be integrally structured with the display unit 30, or may be structured as a unit that is separate from the display unit 30 and disposed in the space at the foot of the driver. Further, each of the constituent elements 602 to 607 that constitute the apparatus main body 20 is realized by the CPU that reads from the storing unit, software (a program) to achieve each processing or function that operates on the computer and executes this software.

Figure 19:
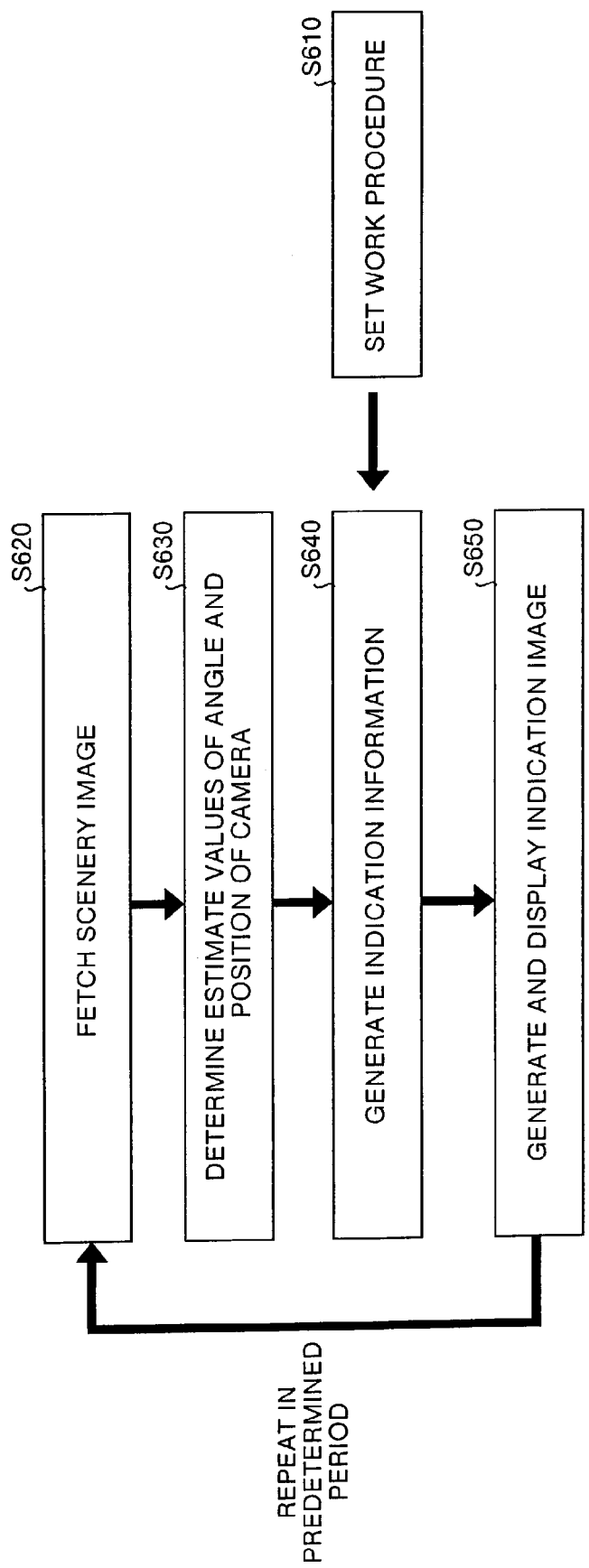
FIG. 19 is a flowchart that shows a processing procedure of the video navigation apparatus shown in FIG. 18.

The processing operation of the video navigation apparatus will be explained with reference to FIG. 19.

As shown in FIG. 16, the video navigation apparatus stores data that shows a preset work procedure into the work procedure storing unit 604 (step S610). The scenery image storing unit 601, that is, a frame glover, fetches and stores a vide signal input from the camera 10 (step S620). The estimating unit 602 determines estimate values of a position and angles of the camera 10 based on sensor information from the position and angle sensor 40, and stores these pieces of information into the estimate value storing unit 603 (step S630).

The indication information generating unit 606 generates indication information based on work procedure information stored in the work procedure storing unit 604 and progress state information stored in the progress state storing unit 605 (step S640). Then, the indication image generating unit 607 processes the indication information generated by the indication information generating unit 606 based on position information that shows a position and angle information that shows angles of the camera 10 stored in the estimate value storing unit 603, and generates an indication image. Thereafter, the indication image generating unit 607 displays this indication image in the display unit 30 (step S650).

The processing contents of the processing procedure that shows the processing operation of the video navigation apparatus will be explained in detail. A state that the video navigation apparatus is mounted on a forklift and a work procedure of loading and unloading a cargo is indicated to a driver will be explained.

(1) Setting a Work Procedure (The Processing at Step S610)

Figure 20:
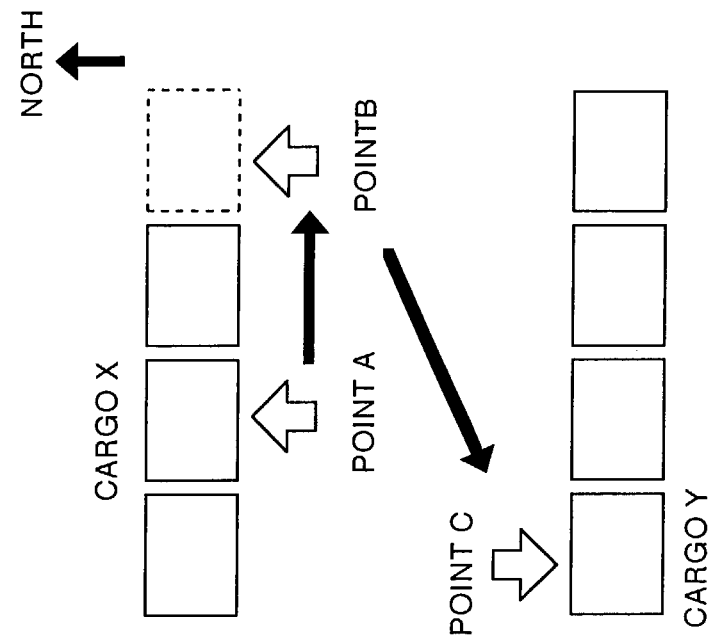
FIG. 20 is a diagram that explains one example of work procedure information stored in a work procedure storing unit of the video navigation apparatus shown in FIG. 18.

FIG. 20(a) shows one example of a work procedure, and FIG. 20(b) shows a diagram that explains the work contents according to the work procedure.

In the work procedure shown in FIG. 20(a), work of carrying a cargo X from a point A to a point B, then moving to a point C and loading a cargo Y is explained by dividing the work into six steps. Each step shows a kind of work and an object of the work. As kinds of work, there are three of "move", "load a cargo", and "unload a cargo". Further, "a target place as an object" is described for the move, and "a name of a cargo as an object" is described for the unloading of the cargo.

Data (work procedure information) that shows this work procedure may be artificially prepared and stored in advance in a storing unit within a video navigation apparatus. Alternatively, the data may be sent from an external computer using a communication unit (in other words, a video navigation apparatus downloads data that shows a work procedure from an external computer via a communication unit).

(2) Fetching a Scenery Image (The Processing at Step S620)

In this processing, the scenery image storing unit 601, that is, a frame glover, fetches an image from the camera 10 in a predetermined period such as once per one second, for example, like in the first to fifth embodiments.

(3) Estimating Position and Angle Information (The Processing at Step S630)

In this processing, the estimating unit 602 fetches an output of the position and angle sensor (a position sensor and an angle sensor) 40, and estimates position information (coordinate values of x, y, z) that shows a current position and angle information (angles corresponding to pan, tilt, and rotate) that shows angles of the camera 10. In this sixth embodiment, an estimate image may be generated based on estimate values, and the estimate values may be corrected by collating the generated estimate image with a scenery image stored in the scenery image storing unit 601, in a similar manner to that of the first to fifth embodiment. In this case, it is possible to further improve the precision or make the apparatus smaller.

(4) Generating Indication Information (The Processing at Step S640)

In order to generate an indication image according to a progress state of the work, it is necessary to manage to understand to which level the work has been progressed at present. For this purpose, "the next step to be executed" is stored in the progress state storing unit 605. This is realized as follows, for example.

The video navigation apparatus is set such that it is always able to understand current position information and angle information and a current vehicle (work vehicle) state. Information stored in the estimate value storing unit 603 is used as the current position information and angle information. On the other hand, as the current state of the vehicle, whether the vehicle is in a state of loading a cargo or in a state of unloading a cargo is mechanically detected. It is possible to know a position, angles, and a vehicle state at the time of completing the work step currently executed, based on data that shows the work procedure. In other words, the current position, angles, and vehicle state are compared with a position, angles, and a vehicle state at the time of completing the next step to be executed respectively. When they coincide with each other, it is regarded that this step (the next step to be executed) has been completed, and further, the next step to be executed is updated to the next step.

Figure 21:
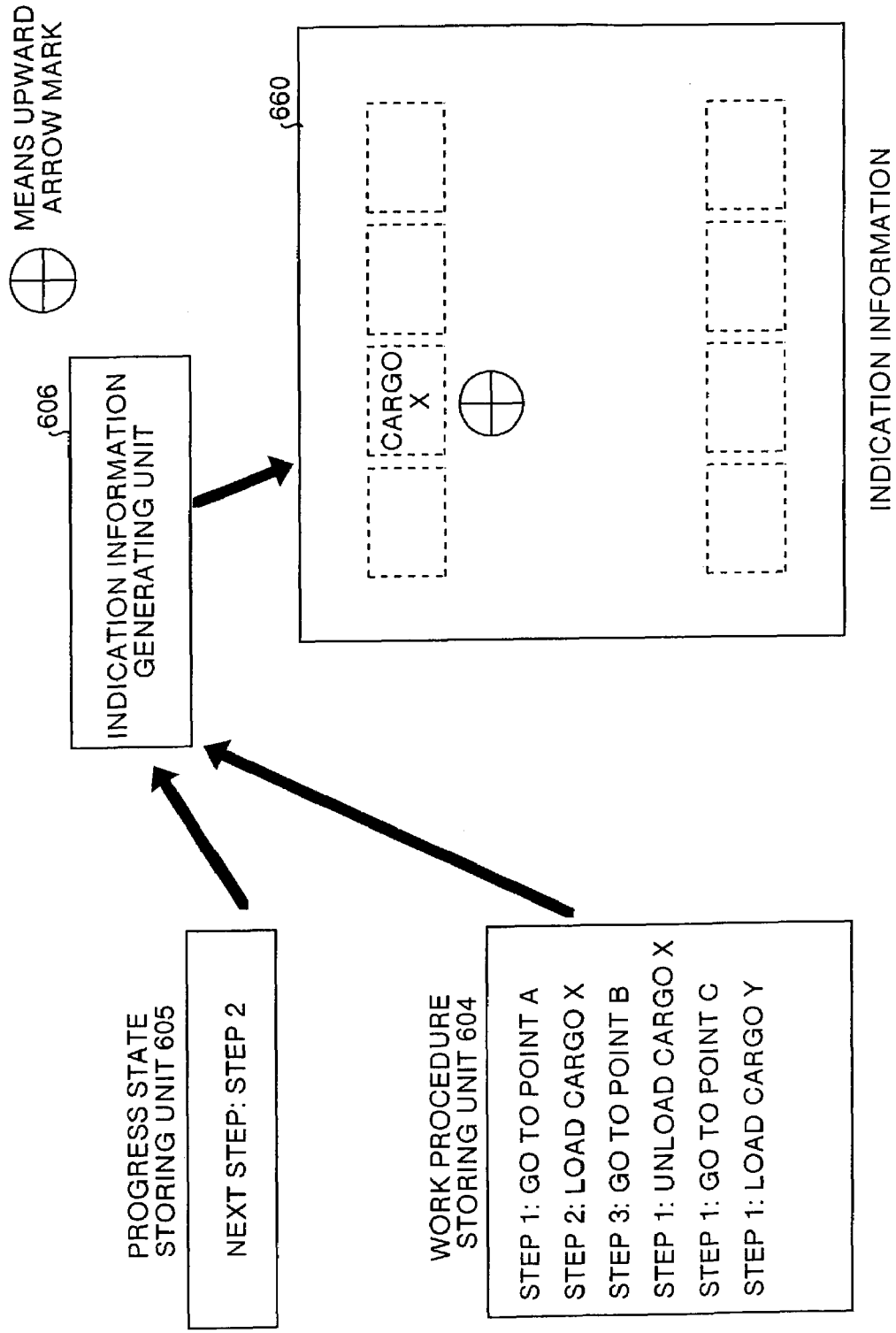
FIG. 21 is a diagram that explains one example of indication information generated by an indication information generating unit of the video navigation apparatus shown in FIG. 18.
Figure 23:
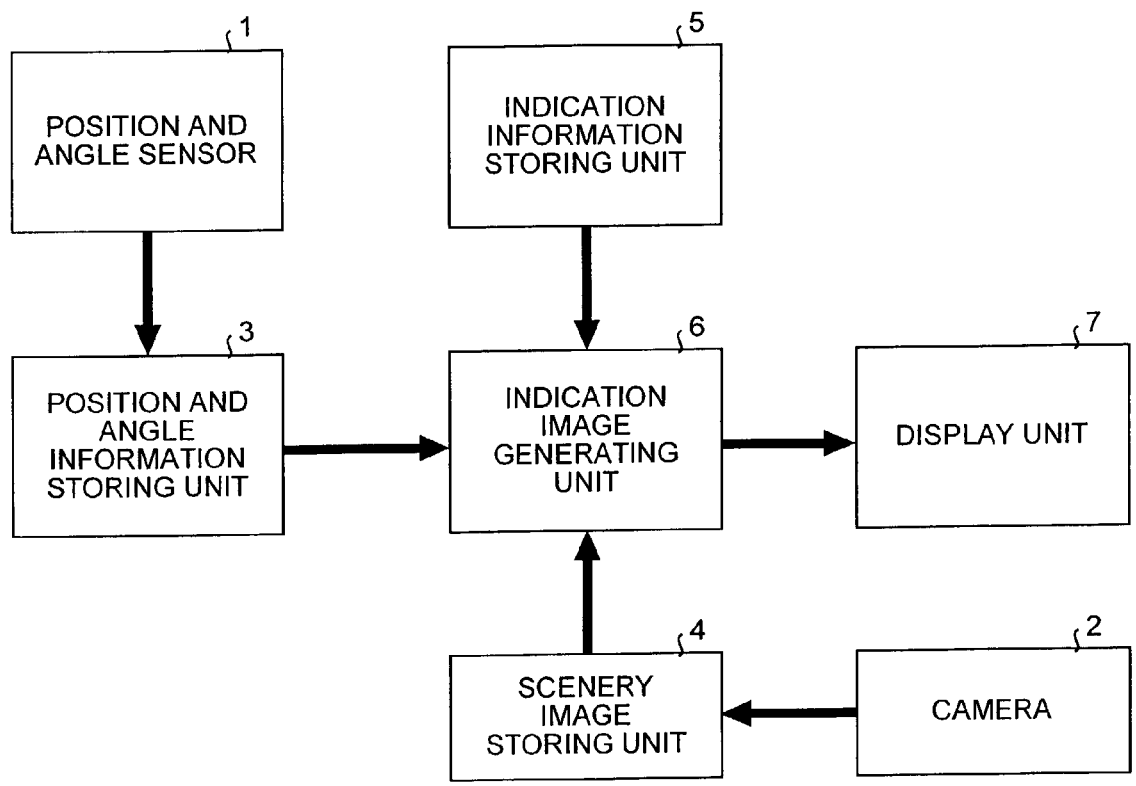
FIG. 23 is a block diagram that shows a structure of a conventional video navigation apparatus.

For example, it is assumed that the progress state storing unit 605 stores information that shows that the next step to be executed is step 2, such as information "the next step, step 2", as shown in FIG. 21. Further, it is also assumed that the store contents of the work procedure storing unit 604 shown in FIG. 21 are the same as the work procedure example shown in FIG. 20(a). When the step 2 has been completed, a position of the vehicle (that is, the camera 10) must be the point A, an angle must be a north direction, and a vehicle state must be a cargo loading state, as shown in FIG. 20(b). Therefore, the progress state storing unit 605 periodically checks the current state, and decides that the step 2 has been completed when this state has been detected. Then, the progress state storing unit 605 stores information that shows that the next step to be executed is step 3, such as information "the next step, step 3". With this arrangement, the progress state storing unit 605 always shows the next step to be executed.

The indication information generating unit 606 generates indication information based on the data that shows the work procedure stored in the work procedure storing unit 604 and the information stored in the progress state storing unit 605. For example, when the next step to be executed is the step 2, indication information shown by a symbol 660 in FIG. 21 is generated as indication information. In other words, an upward arrow mark that means that a cargo is loaded is inserted into a point corresponding to the point A on a map (refer to FIG. 20(b)). Further, a character string "cargo X" is inserted into a position of the cargo X, in order to show that the cargo X is loaded.

When the next step to be executed further proceeds and the next step to be executed is step 4, a downward arrow mark that means that a cargo is unloaded is inserted into a point corresponding to the point B on the map (refer to FIG. 20(b)). Further, a character string "cargo X" is inserted into a position at which the cargo is to be unloaded, in order to show that the cargo X is unloaded.

(5) Generating and Displaying an Indication Image (The Processing at Step S650)

In this processing, the indication image generating unit 607 generates an indication image based on indication information generated by the indication information generating unit 606. FIG. 22(a) shows one example of an indication image that has been generated at the step 2 in the work procedure shown in FIG. 20(a), and FIG. 22(b) shows one example of an indication image that has been generated at the step 4 in the work procedure. The method of generating these indication images is similar to those of the first to fifth embodiments. In other words, the indication information of an arrow mark and a character string set in the world coordinate system is converted into coordinates corresponding to a position and angles of the camera 10. These coordinates are combined with a scenery image to generate an indication image.

FIG. 22(a) shows an upward arrow mark that shows that the cargo X is loaded. On the other hand, FIG. 22(b) shows a downward arrow mark that shows that the cargo X is unloaded.

As explained above, according to the sixth embodiment, the indication information generating unit 606 generates indication information based on work procedure information set in advance and current progress state information of the work. Then, the indication image generating unit 607 generates an indication image based on the generated indication information and a scenery image. Therefore, it is possible to sequentially indicate a series of work procedure following this order. As a result, the driver of the work vehicle can execute the work operation by referring to the indication image displayed according to each step in the work procedure, and it becomes possible to improve work efficiency.

According to the sixth embodiment, the progress state storing unit 605 decides a progress state of the work based on work procedure information stored in the work procedure storing unit 604 and estimate values of a position or angles, or based on the work procedure information and a current state of the work vehicle (the vehicle). Therefore, it is possible to automatically understand a progress state of the work, and indicate the next work step.

As explained above, according to this invention, the collating unit collates an estimate image with a scenery image, and corrects position information and angle information. Therefore, it is possible to improve the precision of position information and angle information, and it is possible to generate and provide an indication image that corresponding to an accurate position and direction of a user. Further, it is possible to accurately know position information and angle information without using a position sensor or an angle sensor of high precision. Therefore, it is possible to make the video navigation apparatus compact and light.

According to the next invention, the indication image generating unit processes indication information based on position information and angle information of the photographing unit, and generates an indication image by combining a result of the processing with a scenery image or an estimate image. Therefore, it is possible to intuitively understand a relationship between an actual scene and indication information.

According to the next invention, the estimating unit estimates a position and angles based on position information and angle information up to the present. Therefore, it is possible to restrict (make small) an error of estimate values. Consequently, it becomes possible to reduce the processing of collating a scenery image with an estimate image, and increase the precision of collation. As a result, it is possible to obtain accurate position information and angle information with little calculation.

According to the next invention, the estimate image generating unit generates an estimate image corresponding to estimate values of a position and angles of the photographing unit based on space information set in advance. Therefore, it is possible to generate an estimate image at an optional position and angles of the photographing unit.

According to the next invention, the estimate image generating unit generates an actual photograph image corresponding to estimate values of a position and angles of the photographing unit as an estimate image. Therefore, it is possible to prepare data with relatively little work in advance.

According to the next invention, the estimating unit estimates the next target position of a user as estimate values based on the indication information. Therefore, a generated estimate image expresses the next target object of the user. Consequently, by collating this estimate image with a scenery image, the user can decide whether the self is approaching the next target position or not.

According to the next invention, the photographing unit is maintained at a predetermined angle of the next target of the user. Therefore, when the user has reached the next target position, it is possible to securely catch the object with the photographing unit.

According to the next invention, the collating unit notifies a user of a level of coincidence between a scenery image and an estimate image, and urges the user to behave to improve the level of coincidence between the scenery image and the estimate image. Therefore, it is possible to guide the user properly to the next target position.

According to the next invention, when a series of position information and angle information do not satisfy a predetermined condition, the collating unit collates an estimate image with a scenery image again by tracing back the series. Therefore, it is possible to increase the precision of correcting position information and angle information.

According to the next invention, indication information is selected based on a distance between the photographing unit and a position corresponding to the indication information and angles, or a positional relationship between the photographing unit and a position corresponding to the indication information and a structure on the space. Therefore, it is possible to generate an indication image that is easy to look at, by restricting (reducing) indication information to be displayed.

According to the next invention, when the indication information generating unit has generated indication information based on work procedure information set in advance and current progress state information of the work, the indication image generating unit generates an indication image based on the generated indication information and a scenery image. Therefore, it is possible to indicate a series of work procedure following this order. As a result, a driver of a work vehicle can execute the work operation by referring to an indication image displayed according to each step in the work procedure.

According to the next invention, the progress state storing unit decides a progress state of the work based on the work procedure information and estimate values of a position or angles. Therefore, it is possible to automatically understand a progress state of the work and indicate the next work step.

According to the next invention, a progress state of the work is decided based on the work procedure information and a current state of the vehicle. Therefore, it is possible to automatically understand a progress state of the work and indicate the next work step.

INDUSTRIAL APPLICABILITY

As explained above, a video navigation apparatus relating to the present invention is suitable to provide indication information by using a vehicle-mounted information terminal or a portable information terminal.

The invention claimed is:

1. A video navigation apparatus comprising:
a photographing unit that photographs a scene;
an estimating unit that estimates a position and angles of the photographing unit;
an estimate image generating unit that generates an estimate image corresponding to estimate values of a position and angles of the photographing unit estimated by the estimating unit;
a collating unit that collates an estimate image generated by the estimate image generating unit with a scenery image photographed by the photographing unit, and corrects an estimate value estimated by the estimating unit according to a result of the collation, which includes a value of difference between the estimate image and the scenery image, wherein the collating unit further estimates a value of error of the estimate value based on the value of difference between the estimate image and the scenery image;
an indication image generating unit that generates an indication image by processing indication information indicated in advance based on position information that shows a position of the photographing unit and angle information that shows angles of the photographing unit after correction processing by the collating unit; and a display unit that displays an indication image generated by the indication image generating unit.

2. The video navigation apparatus according to claim 1, wherein the indication image generating unit processes the indication information based on the position information and the angle information, and generates an indication image by combining a result of the processing with any one of the scenery image photographed by the photographing unit and an estimate image generated by the estimate image generating unit.

3. The video navigation apparatus according to claim 1, wherein the estimating unit estimates a current position and angles of the photographing unit based on the record of information on positions and angles of the photographing unit up to the present.

4. The video navigation apparatus according to claim 1, wherein the estimate image generating unit generates an estimate image corresponding to estimate values of a position and angles of the photographing unit based on space information set in advance.

5. The video navigation apparatus according to claim 1, wherein the estimate image generating unit generates an actual photograph image corresponding to estimate values of a position and angles of the photographing unit as an estimate image.

6. The video navigation apparatus according to claim 1, wherein the estimating unit sets a next target position of a user as estimate values based on the indication information.

7. The video navigation apparatus according to claim 1, further comprising:
a control unit that controls the photographing unit to maintain a predetermined angle that is determined based on the indication information.

8. The video navigation apparatus according to claim 1, wherein the collating unit notifies a user of information that shows a level of coincidence between the scenery image and the estimate image or a change in the coincidence level.

9. The video navigation apparatus according to claim 1, further comprising:
a first storing unit that stores a series of information that show positions and angles of the photographing unit; and
a second storing unit that stores a series of scenery images, wherein when the series of information that show positions and angles of the photographing unit stored in the first storing unit do not satisfy a predetermined condition, the collating unit collates an estimate image with the scenery image again by tracing back the series based on the contents stored in the first and second storing units.

10. The video navigation apparatus according to claim 1, wherein the indication image generating unit selects the indication information based on a distance between the photographing unit and a position corresponding to the indication information and angles of a corner formed by a direction of a straight line that connects between the photographing unit and a position corresponding to the indication information and a view direction of the photographing unit, or a positional relationship between the photographing unit and a position corresponding to the indication information and a structure on a space, and processes an indication image by processing the indication information selected.

11. The video navigation apparatus according to claim 1, wherein the collating unit performs a feed forward correction of the estimate value.

12. The video navigation apparatus according to claim 1, wherein the indication image generation unit indicates the position and angle of the photographing unit overlaid on to the photographed scene.

13. A video navigation apparatus comprising:
a photographing unit that photographs a scene;
an estimating unit that estimates a position and angles of the photographing unit;
a collating unit that collates an estimate image generated by the estimate image generating unit with a scenery image photographed by the photographing unit, and corrects an estimate value estimated by the estimating unit according to a result of the collation, which includes a value of difference between the estimate image and the scenery image, wherein the collating unit further estimates a value of error of the estimate value based on the value of difference between the estimate image and the scenery image;
an indication information generating unit that generates indication information based on work procedure information that shows a work procedure set in advance and progress state information that shows a progress state of a work implemented based on the work procedure;
an indication image generating unit that generates an indication image by processing the indication information generated by the indication information generating unit based on position information that shows a position of the photographing unit and angle information that shows angles of the photographing unit estimated by the estimating unit; and
a display unit that displays an indication image generated by the indication image generating unit.

14. The video navigation apparatus according to claim 13, further comprising:
a progress state storing unit that decides a progress state of the work based on the work procedure information and estimate values of the position information or the angle information estimated by the estimating unit, and stores a result of the decision.

15. The video navigation apparatus according to claim 13, further comprising:
a progress state storing unit that is mounted on a working vehicle, and that decides a progress state of the work based on the work procedure information and a current state of the vehicle, and stores a result of the decision.

16. The video navigation apparatus according to claim 13, wherein the indication image generation unit indicates the position and angle of the photographing unit overlaid on to the photographed scene.

17. A computer-readable recording medium that stores therein a computer program for outputting information, the computer program causing a computer to execute steps of:
receiving an image data representative of a scene;
estimating with an estimating unit a position and angles of the image data representative of a scene;
generating an estimate image with an estimate image generating unit corresponding to estimate values of a position and angles of the image data representative of a scene estimated by the estimating unit;
collating with a collating unit the estimate image generated by the estimate image generating unit with the image data representative of a scene, and corrects an estimate value estimated by the estimating unit according to a result of the collation, wherein the collating with collating unit notifies a user of information that shows a level of coincidence between the image data representative of a scene and the estimate image or a change in the coincidence level;

generating an indication image with an indication image generating to be displayed by processing indication information indicated in advance based on position information that shows a position of the image data representative of a scene after correction processing by the collating unit; and displaying with a display with the indication image generated by the indication image generating unit.

18. A video navigation processor comprising:

an image processor for processing an image data representative of a scene processor;

an estimation processor that estimates a position and angles of the image data representative of a scene;

an estimate image generating processor that generates an estimate image corresponding to estimate values of a position and angles of the image data representative of a scene estimated by the estimating processor;

a collating processor that collates an estimate image generated by the estimate image generating processor with the image data representative of a scene, and corrects an estimate value estimated by the estimating processor according to a result of the collation, wherein the collating processor notifies a user of information that shows a level of coincidence between the image data representative of a scene and the estimate image or a change in the coincidence level; and an indication image generating processor that generates an indication image to be displayed by processing indication information indicated in advance based on position information that shows a position of the image data representative of a scene after correction processing by the collating processor.

19. A video navigation apparatus comprising:

an inputting unit inputting an input image representative of a scene;

an estimating unit that estimates position and angle values within the scene for the input image;

an estimate image generating unit that generates an estimate image corresponding to an estimated perspective determined from estimated position and angle values of the scene estimated by the estimating unit;

a collating unit that collates an estimate image with an input image of a scene, and corrects an estimated position and angle values according to a result of the collation, wherein the collating unit notifies a user of position information that shows a level of coincidence between the input image and the estimate image or a change in the coincidence level; and an indication image generating unit that generates an indication image to be displayed based on position information that shows a position of the image based on position and angle values after correction processing by the collating unit.

20. A video navigation apparatus comprising:

an inputting unit inputting an input image representative of a scene from the perspective of a navigated element;

an estimating unit that estimates position and angle values within the scene for the input image;

an estimate image generating unit that generates an estimate image corresponding to an estimated perspective determined from estimated position and angle values of the scene estimated by the estimating unit;

a collating unit that collates an estimate image with an input image of a scene, and corrects an estimated position and angle values according to a result of the collation, wherein the collating unit notifies a user of information that shows a level of coincidence between the input image and the estimate image or a change in the coincidence level; and a navigation unit that navigates the navigation element based on position information that represents position based on position and angle values after correction processing by the collating unit.

21. The video navigation apparatus according to claim 20, wherein the navigated element is a vehicle.

22. The video navigation apparatus according to claim 21, wherein the vehicle is controlled by an operator receiving said position information on a display.

23. A computer-readable storage medium having a computer program stored therein, the computer program when executed causes a computer to perform the steps of:

receiving an image data representative of a scene;

estimating with an estimating unit a position and angles of the image data representative of a scene;

generating an estimate image with an estimate image generating unit corresponding to estimate values of a position and angles of the image data representative of a scene estimated by the estimating unit;

collating with a collating unit that estimates image generated by the estimate image generating unit with the image data representative of a scene, and corrects an estimate value estimated by the estimating unit according to a result of the collation, wherein the collating with the collating unit notifies a user of information that shows a level of coincidence between the image representative of a scene and the estimate image or a change in the coincidence level; and navigating with navigation unit that navigates based on position information that shows a position of the image representative of a scene after correction processing by the collating unit.

24. A video navigation processor comprising:

an image processor for processing an image data representative of a scene processor;

an estimation processor that estimates a position and angles of the image data representative of a scene;

an estimate image generating processor that generates an estimate image corresponding to estimate values of a position and angles of the image data representative of a scene estimated by the estimating processor;

a collating processor that collates an estimate image generated by the estimate image generating processor with the image data representative of a scene and corrects an estimate value estimated by the estimating processor according to a result of the collation, wherein the collating processor notifies a user of information that shows a level of coincidence between the image data representative of a scene and the estimate image or a change in the coincidence level; and a navigating processor that navigates based on position information that shows a position of the image representative of a scene after correction processing by the collating unit.

* * * * *